United States Patent
Smith et al.

(10) Patent No.: US 6,885,308 B2
(45) Date of Patent: Apr. 26, 2005

(54) LOGGING WHILE TRIPPING WITH A MODIFIED TUBULAR

(75) Inventors: David L. Smith, Stafford, TX (US); Mark T. Frey, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 242 days.

(21) Appl. No.: 10/065,845

(22) Filed: Nov. 25, 2002

(65) Prior Publication Data

US 2003/0056984 A1 Mar. 27, 2003

Related U.S. Application Data

(63) Continuation-in-part of application No. 09/576,271, filed on May 22, 2000, now Pat. No. 6,577,244.

(51) Int. Cl.$^7$ ................................................. G01V 3/00
(52) U.S. Cl. ........................ 340/854.6; 340/853.2; 340/854.4; 324/339; 324/369
(58) Field of Search ...................... 340/854.6, 853.2, 340/853.3, 854.4; 324/339, 369

(56) References Cited

U.S. PATENT DOCUMENTS

| | | |
|---|---|---|
| 3,746,106 A | 7/1973 | McCullough et al. |
| 4,296,321 A | 10/1981 | Blincow et al. |
| 4,684,946 A | 8/1987 | Issenmann |
| 4,879,463 A | 11/1989 | Wraight et al. |
| 4,901,069 A | 2/1990 | Veneruso |
| 5,123,492 A | 6/1992 | Lizanec, Jr. |
| 5,168,942 A | 12/1992 | Wydrinski |
| 5,250,806 A | 10/1993 | Rhein-Knudsen et al. |
| 5,563,512 A | 10/1996 | Mumby |
| 5,589,825 A | 12/1996 | Pomerleau |
| 5,988,300 A | 11/1999 | Pomerleau |
| 6,297,639 B1 | 10/2001 | Clark et al. |
| 6,483,310 B1 | 11/2002 | Meador |
| 6,566,881 B2 | 5/2003 | Rosthal et al. |
| 6,577,244 B1 | 6/2003 | Clark et al. |
| 6,614,227 B2 | 9/2003 | Ookubo |
| 2002/0057210 A1 | 5/2002 | Frey et al. |
| 2002/0079899 A1 | 6/2002 | Frey et al. |

FOREIGN PATENT DOCUMENTS

| | | |
|---|---|---|
| EP | 0 505 260 A3 | 9/1992 |
| WO | WO 97/08425 | 3/1997 |
| WO | WO 01/04662 A1 | 1/2001 |
| WO | WO 01/06085 A1 | 1/2001 |

*Primary Examiner*—Albert K. Wong
(74) *Attorney, Agent, or Firm*—Kevin P. McEnaney; Brigitte L. Echols; John J. Ryberg

(57) ABSTRACT

Method and system for subsurface logging utilizing a modified tubular having an elongated body with tubular walls and a central bore adapted to receive a support member. The tubular including slotted stations to provide through-tubular signal passage. Pressure barrier means provide hydraulic isolation at the slotted stations. The support member is equipped with sources or sensors and adapted for engagement within the tubular. The tubular and support member are implemented in combination with retrievable and re-seatable MWD apparatus.

36 Claims, 19 Drawing Sheets

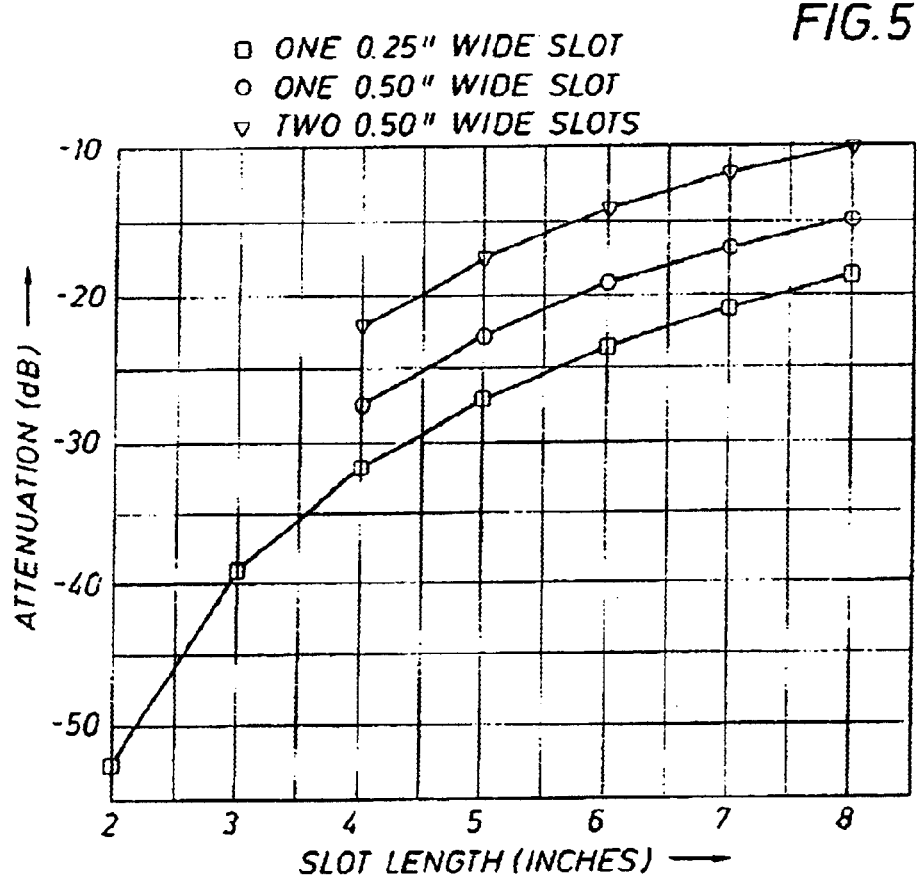
FIG.5
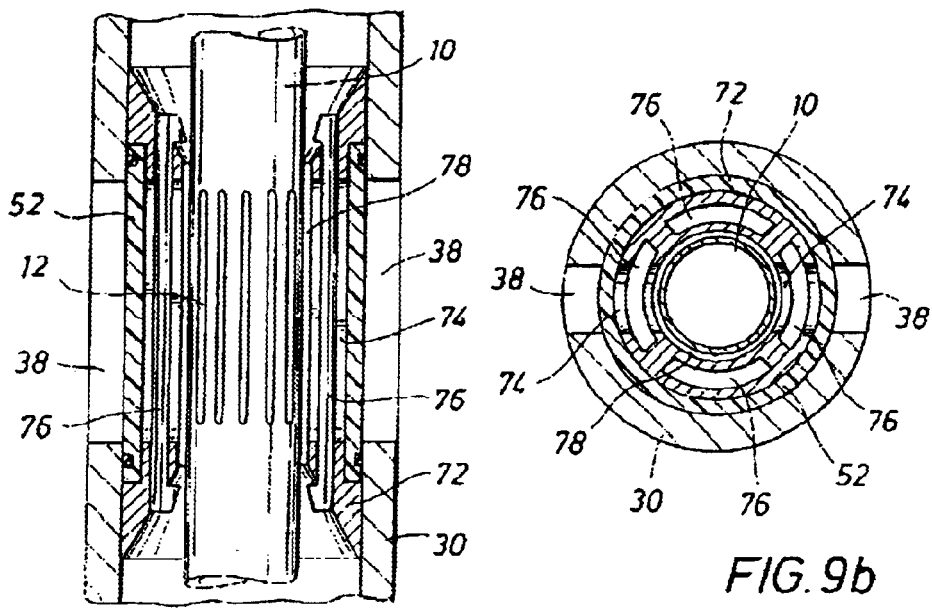
FIG.9a
FIG.9b

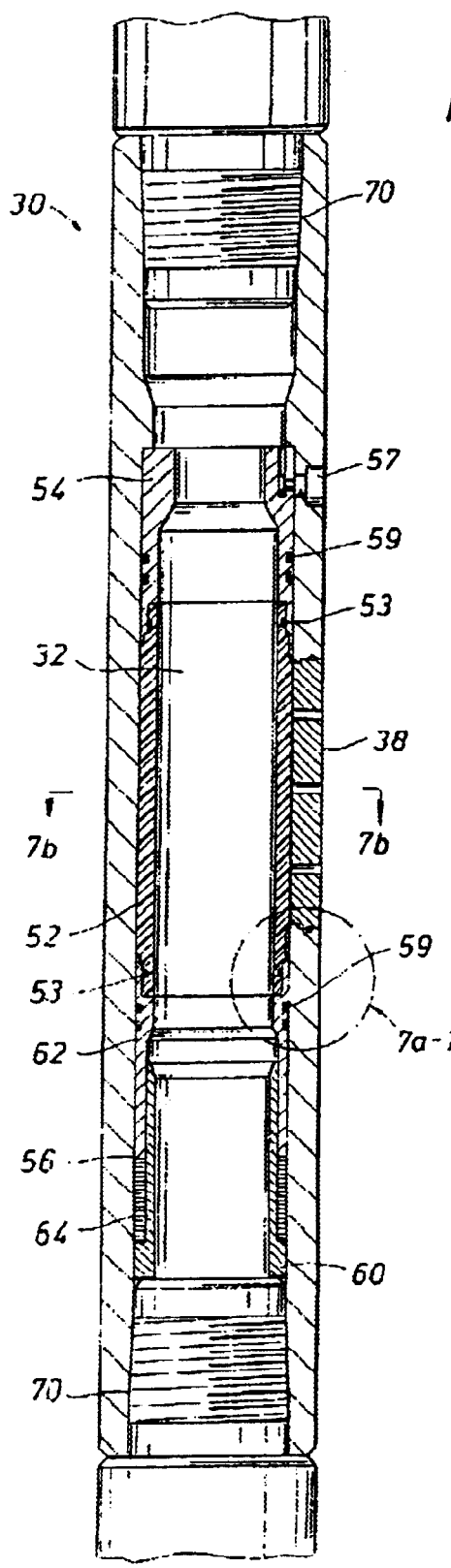
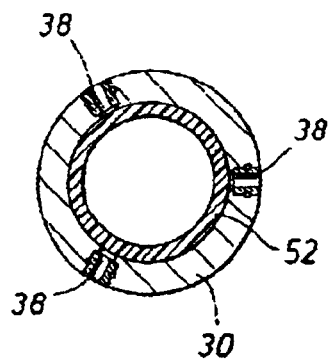
FIG. 7a
FIG. 7b
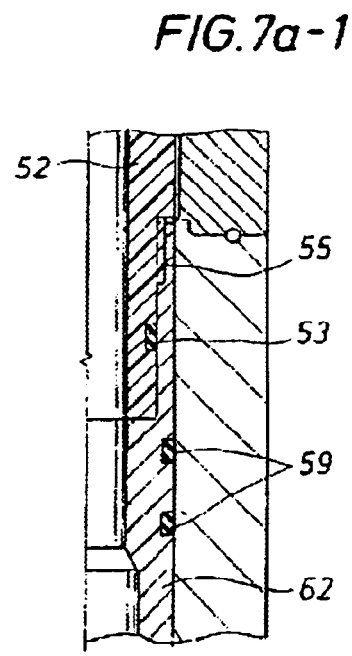
FIG. 7a-1

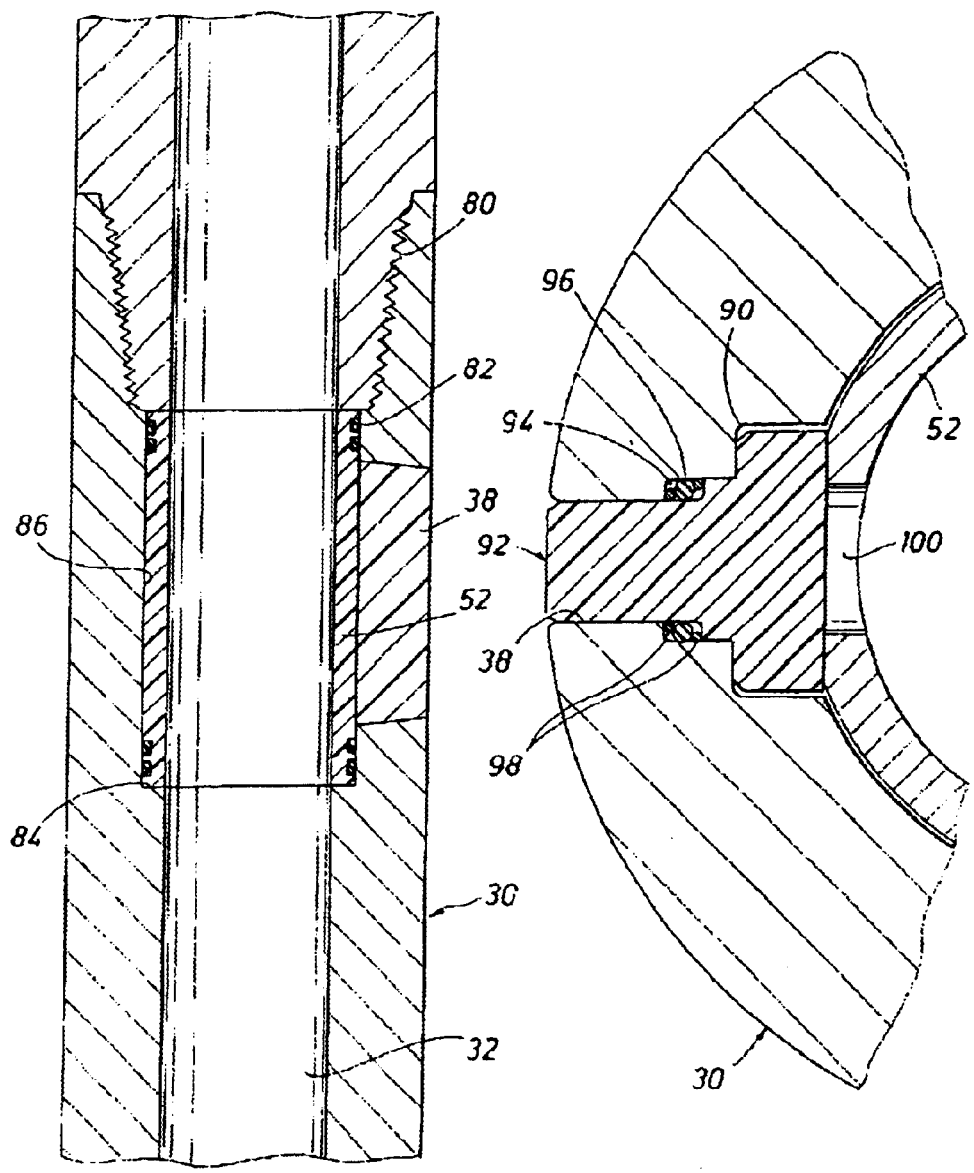

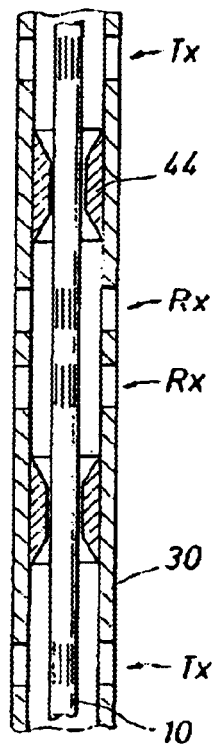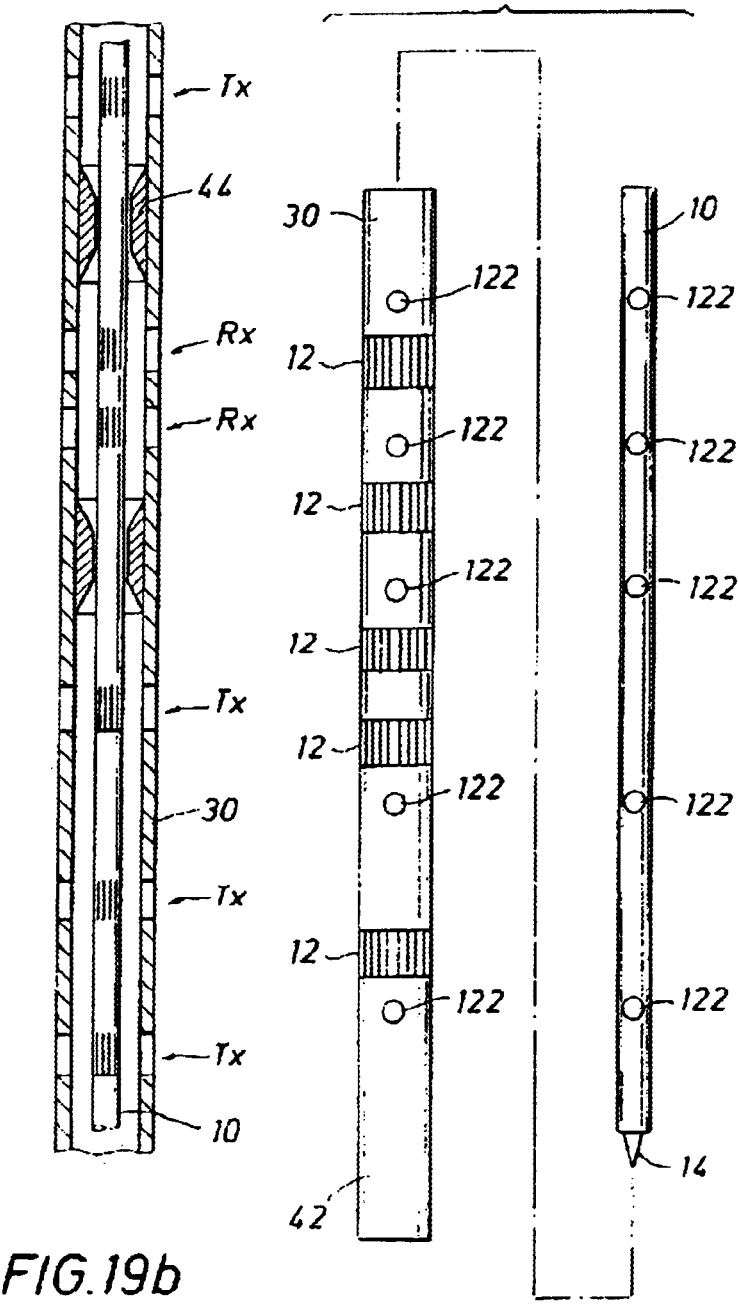

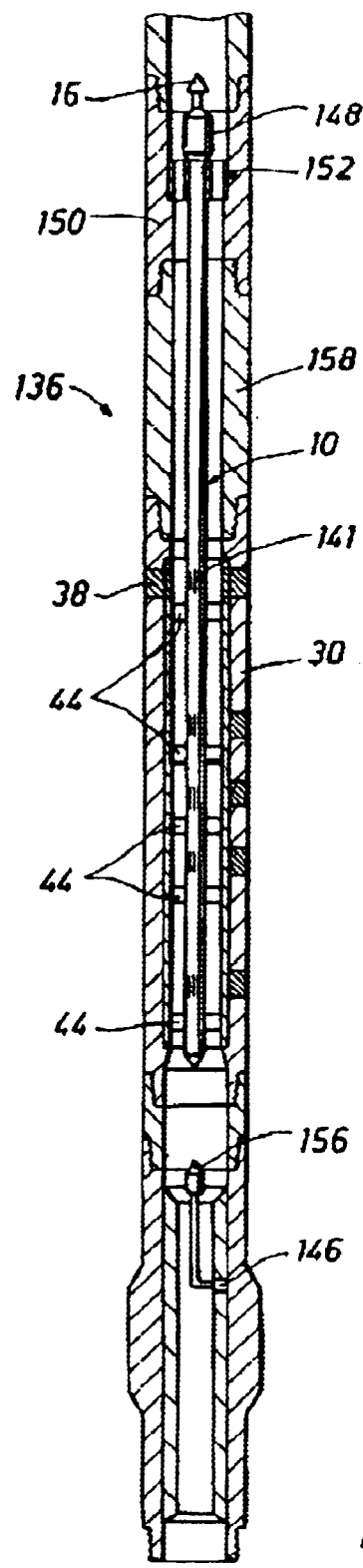
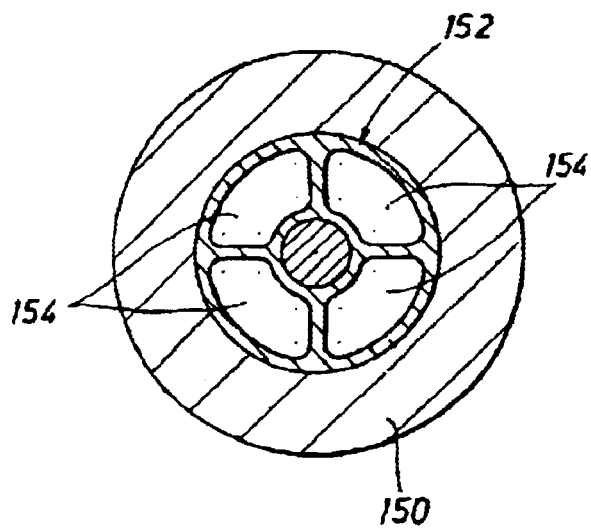
FIG. 32
FIG. 31

LOGGING WHILE TRIPPING WITH A MODIFIED TUBULAR

CROSS REFERENCE TO RELATED APPLICATIONS

This application is a continuation-in-part of U.S. patent application Ser. No. 09/576,271, filed May 22, 2000. now U.S. Pat. No. 6,577,244.

BACKGROUND OF INVENTION

1. Field of the Invention

This invention relates generally to investigation of subsurface earth formations, and, more particularly, to techniques for transmitting and/or receiving a signal through a metallic tubular using a run-in tool adapted for disposal within and extraction from the metallic tubular. Embodiments of the invention are particularly suited for implementation with retrievable and re-seatable MWD apparatus.

2. Description of Related Art

Resistivity and gamma-ray logging are the two formation evaluation measurements run most often in well logging. Such measurements are used to locate and evaluate the properties of potential hydrocarbon bearing zones in subsurface formations. In many wells, they are the only two measurements performed, particularly in low cost wells and in surface and intermediate sections of more expensive wells.

These logging techniques are realized in different ways. A well tool, comprising a number of transmitting and detecting devices for measuring various parameters, can be lowered into a borehole on the end of a cable, or wireline. The cable, which is attached to some sort of mobile processing center at the surface, is the means by which parameter data is sent up to the surface. With this type of wireline logging, it becomes possible to measure borehole and formation parameters as a function of depth, i.e., while the tool is being pulled uphole.

Some wells may not be logged because wireline logging is too expensive, when rig time is included in the total cost. Conditioning the well for wireline logging, rigging up the wireline tools, and the time to run the wireline tools in and out require rig time. Horizontal or deviated wells also present increased cost and difficulty for the use of wireline tools.

Other wells present a challenge for wireline conveyance. Wells with extremely rugose, washed out, collapsed, or deviated boreholes can hinder or prevent the well tool from traveling through the borehole. These tough logging conditions (TLC) are typically handled by conveying the tool into the borehole on drillpipe. The instruments are mounted on drillpipe and tripped down into the open hole section. The wireline is protected inside the drillpipe in the open hole section of the well but lies between the drillpipe and the casing running to the surface, where it is prone to damage. Another disadvantage of this technique is that wireline power and communication are required while pushing the tool into the open hole section in order to avoid breaking the tool if an obstruction is encountered. Because of the danger of tool and wireline damage, logging is slow.

An alternative to wireline logging techniques is the collection of data on downhole conditions during the drilling process. By collecting and processing such information during the drilling process, the driller can modify or correct key steps of the operation to optimize performance. Schemes for collecting data of downhole conditions and movement of the drilling assembly during the drilling operation are known as Measurement While Drilling (MWD) techniques. Similar techniques focusing more on measurement of formation parameters than on movement of the drilling assembly are know as Logging While Drilling (LWD). As with wireline logging, the use of LWD and MWD tools may not be justified due to the cost of the equipment and the associated service since the tools are in the hole for the entire time it takes to drill the section.

Logging While Tripping (LWT) presents a cost-effective alternative to LWD and MWD techniques. In LWT, a small diameter "run-in" tool is sent downhole through the drill pipe, at the end of a bit run, just before the drill pipe is pulled. The run-in tool is used to measure the downhole physical quantities as the drill string is extracted or tripped out of the hole. Measured data is recorded into tool memory versus time during the trip out. At the surface, a second set of equipment records bit depth versus time for the trip out, and this allows the measurements to be placed on depth.

U.S. Pat. No. 5,589,825 describes a LWT technique incorporating a logging tool adapted for movement through a drillstring and into a drilling sub. The '825 patent describes a sub incorporating a window mechanism to permit signal communication between a housed logging tool and the wellbore. The window mechanism is operable between an open and closed position. A disadvantage of the proposed apparatus is that the open-window mechanism directly exposes the logging tool to the rugose and abrasive borehole environment, where formation cuttings are likely to damage the logging tool and jam the window mechanism. Downhole conditions progressively become more hostile at greater depths. At depths of 5,000 to 8,000 meters, bottom hole temperatures of 260° C. and pressures of 170 Mpa are often encountered. This exacerbates degradation of external or exposed logging tool components. Thus, an open-window structure is impractical for use in these situations.

UK Patent Application GB 2337546A describes a composite structure incorporated within a drill collar to permit the passage of electromagnetic energy (EM) for use in measurements during the drilling operation. The '546 application describes a drill collar having voids or recesses with embedded composite covers. A disadvantage of the apparatus proposed by the '546 application is the use of composite materials as an integral part of the drill collar. Fatigue loading (i.e., the bending and rotating of the drill pipe) becomes an issue in drilling operations. When the drill pipe is subjected to bending or torsion, the shapes of the voids or recesses change, resulting in stress failure and poor sealing. The differences in material properties between the metal and composite covers are difficult to manage properly where the composite and metal are required to act mechanically as one piece, such as described in the '546 application. Thus, the increased propensity for failure under the extreme stresses and loading encountered during drilling operations makes implementation of the described structure impractical.

U.S. Pat. Nos. 5,988,300 and 5,944,124 describe a composite tube structure adapted for use in a drillstring. The '300 and '124 patents describe a piecewise structure including a composite tube assembled with end-fittings and an outer wrapping connecting the tube with the end-fittings. In addition to high manufacturing costs, another disadvantage of this structure is that the multi-part assembly is more prone to failure under the extreme stresses encountered during drilling operations.

U.S. Pat. No. 5,939,885 describes a well logging apparatus including a mounting member equipped with coil antennas and housed within a slotted drill collar. However, the apparatus is not designed for LWT operations. U.S. Pat. Nos. 4,041,780 and 4,047,430 describe a logging instrument that is pumped down into a drill pipe for obtaining logging samples. However, the system proposed by the '780 and '430 patents requires the withdrawal of the entire drill string (for removal of the drill bit) before any logging may be commenced. Thus, implementation of the described system is impractical and not cost effective for many operations.

U.S. Pat. No. 5,560,437 describes a telemetry method and apparatus for obtaining measurements of downhole parameters. The '437 patent describes a logging probe that is ejected into the drill string. The logging probe includes a sensor at one end that is positioned through an aperture in a special drill bit at the end of the drill string. As such, the sensor has direct access to the drill bore. Disadvantages of the apparatus proposed by the '437 patent are the sensor's direct exposure to the damaging conditions encountered downhole and the requirement of an unobstructed path in the drillstring for the probe to travel, which is incompatible with drillstrings containing a mud-pulse telemetry tool or a mud motor. The use of a small probe protruding through a small aperture is also impractical for resistivity logging.

U.S. Pat. No. 4,914,637 describes a downhole tool adapted for deployment from the surface through the drill string to a desired location in the conduit. A modulator on the tool transmits gathered signal data to the surface. U.S. Pat. No. 5,050,675 (assigned to the present assignee) describes a perforating apparatus incorporating an inductive coupler configuration for signal communication between the surface and the downhole tool. U.S. Pat. No. 5,455,573 describes an inductive coupling device for coaxially arranged downhole tools. U.S. Pat. No. 6,288,548 describes a while-drilling logging technique using a measurement sonde disposed within a drill collar implemented with slots.

It is desirable to obtain a simplified and reliable LWT system and methods for locating and evaluating the properties of potential hydrocarbon bearing zones in subsurface formations. Thus, there remains a need for an improved LWT system and methods for transmitting and/or receiving a signal through an earth formation. There also remains a need for techniques to measure the characteristics of a subsurface formation in combination with retrievable and re-seatable apparatus used to make measurements from within the drill collar.

SUMMARY OF INVENTION

The invention provides a system for receiving a run-in tool The system includes a sub having an elongated body with tubular walls and an inner bore. The sub is adapted to form a portion of a length of drill string and includes at least one slot formed therein such that the slot fully penetrates the tubular wall to provide a channel for the passage of a signal. The sub includes means to provide a pressure barrier between the interior and exterior of the tubular wall at the at least one slot, the barrier means is located within the sub bore. A run-in tool having upper and lower ends and adapted for transit through the drill string and into the sub bore forms part of the system. The run-in tool has means to engage with other apparatus at the upper and lower ends; wherein the upper and lower engagement means on the run-in tool are adapted for selective release from the other apparatus.

The invention provides a method for disposing a run-in tool within a sub in a length of drill string. The method comprises: adapting a run-in tool having upper and lower ends for transit through the drill string and into a sub having an elongated body with tubular walls and an inner bore forming a part of the drill string, the sub including at least one slot fully penetrating its wall to provide a channel for the passage of a signal and barrier means within its bore to provide a pressure barrier between the interior and exterior of the wall at the at least one slot, the run-in tool adapted with selectively releasable means to engage with other apparatus at the upper and lower ends; disposing the drill string with the sub within a subsurface formation, the drill string having an apparatus disposed within its inner bore and positioned near the sub; and disposing the run-in tool within the drill string for engagement with the apparatus disposed within the inner bore of the drill string.

The invention provides a method for disposing a run-in tool within a sub in a length of drill string. The method comprises: adapting a run-in tool having upper and lower ends for transit through the drill string and into a sub having an elongated body with tubular walls and an inner bore forming a part of the drill string, the sub including at least one slot fully penetrating its wall to provide a channel for the passage of a signal and barrier means within its bore to provide a pressure barrier between the interior and exterior of the wall at the at least one slot, the run-in tool having a signal source or sensor disposed thereon and adapted with selectively releasable means to engage with other apparatus at the upper and lower ends; adapting the run-in tool or an apparatus disposed within the bore of the drill string such that the signal source or sensor on the run-in tool is positioned near the at least one slot when the tool is disposed within the sub and engaged with the apparatus; disposing the drill string, along with the sub and the apparatus disposed within its inner bore, within a subsurface formation; and disposing the run-in tool within the drill string for engagement with the apparatus.

The invention provides a system for receiving a run-in tool. The system comprises a first sub having an elongated body with tubular walls and a central bore, the sub being adapted to form a portion of a length of drill string; an elongated run-in tool having upper and lower ends and adapted for transit through the drill string and into the sub bore; the run-in tool adapted with connecting means at the upper end to connect with other apparatus for removal of said tool from the first sub bore; a segment of the run-in tool having an oversized diameter compared to other segments of said tool; the first sub adapted with means to catch and hold the run-in tool by the oversized segment such that a predetermined length of the run-in tool extends into the sub bore and the run-in tool is restricted from further axial displacement into the bore; and the catch and hold means adapted to permit the passage of fluid through the bore while holding the run-in tool by the oversized segment.

The invention also provides a method for disposing a run-in tool within a sub in a length of drill string. The method comprises adapting an elongated run-in tool such that a segment of the tool includes an oversized diameter compared to other segments of the tool, the tool having upper and lower ends and adapted for transit through the drill string; disposing the run-in tool through the drill string for engagement in the bore of a first sub forming part of the drill string; catching the run-in tool by the oversized segment with catch and hold means disposed in the first sub, the catch and hold means permitting a predetermined length of the tool to extend into the sub bore; and with the catch and hold means, restricting the run-in tool from further axial displacement into the bore such that a source or sensor on the tool is positioned near a slot in the wall of the drill string when the tool is engaged within the catch and hold means on the first sub.

BRIEF DESCRIPTION OF DRAWINGS

Other aspects and advantages of the invention will become apparent upon reading the following detailed description and upon reference to the drawings in which:

FIG. 5 graphically illustrates the relationship between the slot dimensions of a tubular segment of the invention and the attenuation of passing electromagnetic energy.

FIG. 7a is a cross-sectional view of a tubular member with a pressure barrier configuration in accord with the invention.

FIG. 7b is a cross-sectional view of a three-slotted tubular member of FIG. 7a along line A—A.

FIG. 9a is a cross-sectional view of a run-in tool positioned in alignment with a pressure barrier configuration in accord with the invention.

FIG. 9b is a top view of the run-in tool and pressure barrier configuration of FIG. 9a.

FIG. 10 is a cross-sectional view of a pressure barrier and tubular member configuration in accord with the invention.

FIG. 11 is a cross-sectional view of a slotted tubular member with an insert, seal, and retaining sleeve in accord with the invention.

FIGS. 19a and 19b are schematic diagrams of run-in tool antenna configurations within tubular members in accord with the invention.

FIG. 20 shows schematic diagrams of a tubular member and run-in tool configuration with inductive couplers in accord with the invention.

FIG. 31 shows a run-in tool engaged within a tubular member adapted with a catch-and-hold centralizer in combination with a slotted tubular forming a drill string in accord with the invention.

DETAILED DESCRIPTION

The apparatus of the invention consists of two main assets, a run-in tool (RIT) and a tubular sleeve or drill collar. Henceforth, the tubular will be referred to as a sub.

Figure 1:
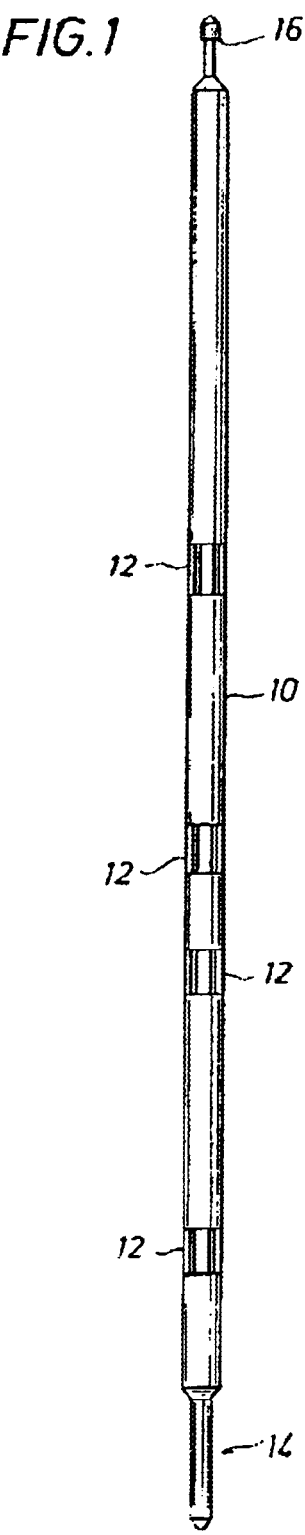
FIG. 1 is a schematic diagram of a run-in tool in accord with the invention.

RIT. FIG. 1 shows an embodiment of the RIT 10 of the invention. The RIT 10 is an elongated, small-diameter, metallic support or mandrel that may contain one or more antennas 12, sources, sensors [sensor/detector are interchangeable terms as used herein], magnets, a gamma-ray detector/generator assembly, neutron-generating/detecting assembly, various electronics, batteries, a downhole processor, a clock, a read-out port, and recording memory (not shown).

The RIT 10 does not have the mechanical requirements of a drill collar. Thus, its mechanical constraints are greatly reduced. The RIT 10 has a landing mechanism (stinger) 14 on the bottom end and a fishing head 16 on the top. The fishing head 16 allows for the RIT 10 to be captured and retrieved from within a sub with the use of a conventional extraction tool such as the one described in U.S. Pat. No. 5,278,550 (assigned to the present assignee). An advantage of the fishable RIT 10 assembly is a reduction of Lost-In-Hole costs. The RIT 10 may also be implemented with one or more articulated or "knuckle" joints as known in the art (see FIG. 29).

Figure 2A:
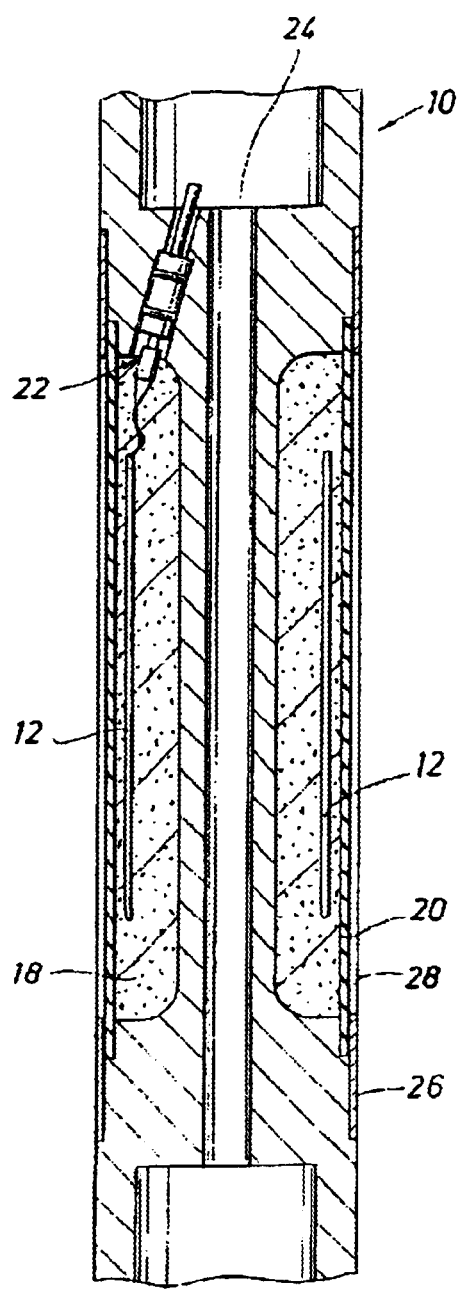
FIG. 2a is a cross-sectional view of a run-in tool showing an antenna with associated wiring and passages in accord with the invention.

As shown in FIG. 2a, one antenna 12 configuration on the RIT 10 consists of multi-turn wire loops encased in fiberglass-epoxy 18 mounted in a groove in the RIT 10 pressure housing and sealed with rubber over-molding 20. A feed-through 22 provides a passage for the antenna 12 wiring, leading to an inner bore 24 within the RIT 10. Each antenna 12 may be activated to receive or transmit an EM signal as known in the art.

Figure 2B:
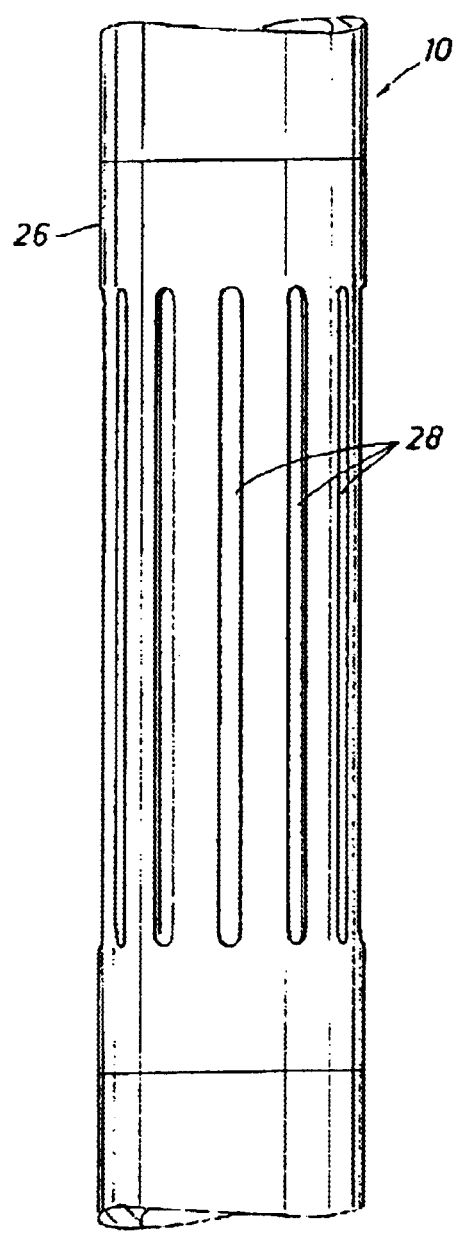
FIG. 2b is a schematic diagram of a shield structure surrounding an antenna on the run-in tool in accord with the invention.

The antennas 12 radiate an azimuthal electric field. Each antenna 12 is preferably surrounded by a stainless-steel shield 26 (similar to those described in U.S. Pat. No. 4,949,045, assigned to the present assignee) that has one or more axial slots 28 arrayed around the shield 26 circumference. FIG. 2b shows the axial slots 28 distributed around the circumference of the shield 26. The shields 26 are short-circuited at the axial ends into the metallic body of the RIT 10. These shields 26 permit transverse electric (TE) radiation to propagate through while blocking transverse magnetic (TM) and transverse electromagnetic (TEM) radiation. The shields 26 also protect the antennas 12 from external damage. The RIT 10 electronics and sensor architecture resembles that described in U.S. Pat. No. 4,899,112 (assigned to the present assignee).

Figure 3:
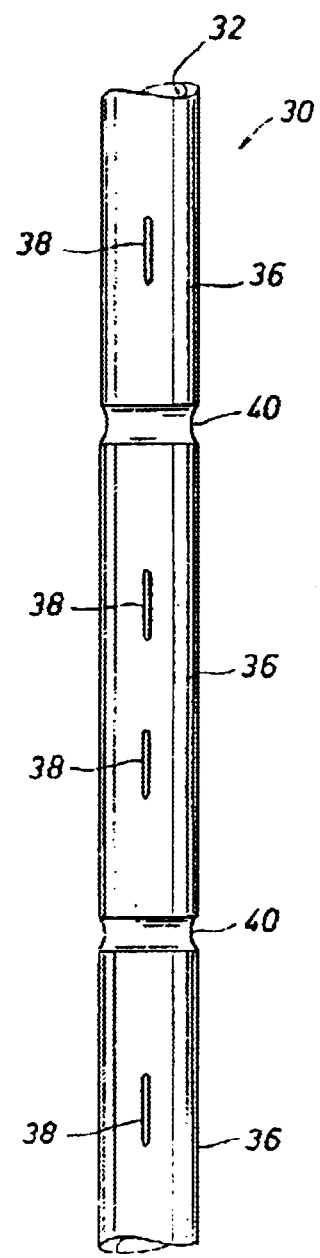
FIG. 3 is a schematic diagram of a tubular member with slotted stations in accord with the invention.

SUB. FIG. 3 shows an embodiment of a sub 30 of the invention. The sub 30 has an elongated body with tubular walls and a central bore 32. The sub 30 contains neither electronics nor sensors and is preferably fully metallic, preferably formed from stainless steel. It may form part of the normal bottom hole assembly (BHA), and it may be placed in the hole with the drill string for the duration of the bit run. One embodiment of the sub 30 has normal threaded oilfield connections (pin and box) at each end (not shown). The sub 30 may also be coupled to coiled tubing or to other tubular segments for conveyance into the wellbore in TLC operations. The sub 30 includes one or more stations 36 with one or more axial slots 38 placed along the tubular wall. Each elongated axial slot 38 fully penetrates the tubular wall of the sub 30 and is preferably formed with fully rounded ends. Stress modeling has shown that rather long slots 38 may be formed in the sub 30 walls while still maintaining the structural integrity of the sub 30. Stress relief grooves 40 may be added to the OD of the sub 30, in regions away from the slot(s) 38, to minimize the bending moment on the slot(s) 38.

Each slot 38 provides a continuous channel for EM energy to pass through the sub 30. The slots 38 block TM radiation but allow the passage of TE radiation, albeit with some attenuation. The degree of attenuation of TE fields by the sub 30 depends on factors such as frequency, the number of slots, slot width, slot length, collar OD and ID, and the location and dimensions of the RIT 10 antenna. For example, FIG. 5 shows the sub 10 attenuation measured at 400 kHz with a 25-turn 1.75-inch diameter coil centered in 3.55-inch ID, 6.75-inch OD subs 30 with one or two slots 38 of different lengths and widths. As evident from FIG. 5, adding more slots 38 and making the slots longer or wider decreases the attenuation. However, with only one or two 0.5-inch wide 6–8 inch long slots 38, the sub 30 attenuation is already ~15 dB, which is sufficiently low for many applications.

Figure 4A:
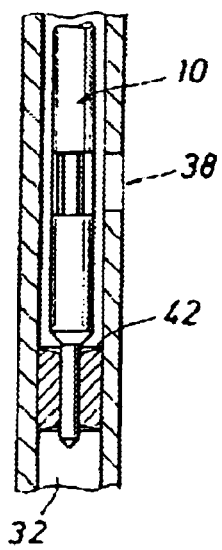
FIGS. 4a and 4b are schematic diagrams of a run-in tool engaged within a tubular member in accord with the invention.
Figure 4B:
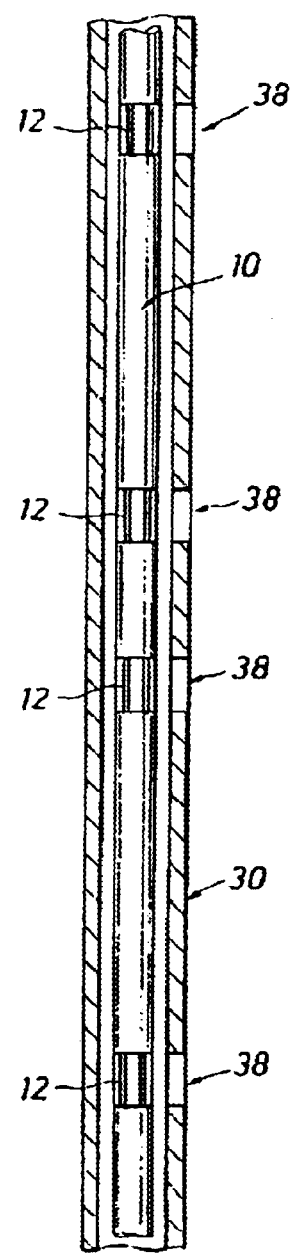

In operation, one embodiment of the RIT 10 is pumped down and/or lowered through the drillstring on cable at the end of the bit run and engaged inside the sub 30. The RIT 10 is received by a landing "shoe" 42 within the central bore 32 of the sub 30, as shown in FIG. 4a. FIG. 4b shows how the RIT 10 is located in the sub 30 so that each antenna 12, source, or sensor, is aligned with a slot 38 in the sub 30. The landing shoe 42 preferably also has a latching action to prevent any axial motion of the RIT 10 once it is engaged inside the sub 30.

Figure 6:
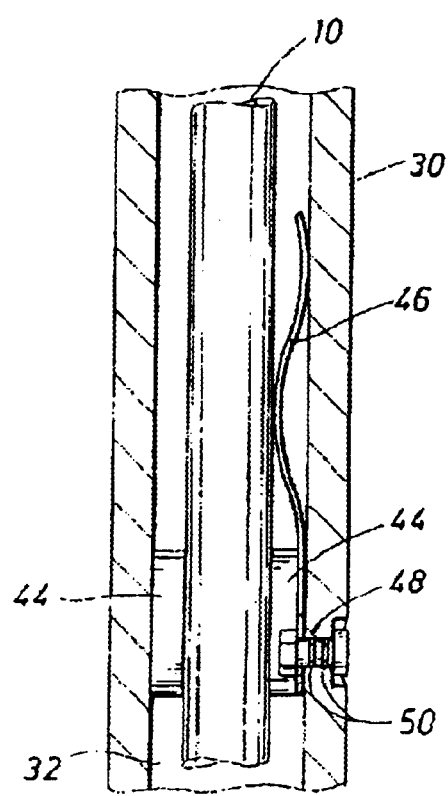
FIG. 6 is a schematic diagram of a run-in tool with a centralizer configuration in accord with the invention.

Turning to FIG. 6, an embodiment of the invention includes a centralizer 44, which serves to keep the RIT 10 centered and stable within the sub 30, lowering shock levels and reducing the effects of tool motion on the measurement. One or more centralizers 44 may be mounted within the central bore 32 to constrain the RIT 10 and keep it from hitting the ID of the sub 30. One or more spring-blades 46 may also be mounted to extend from the centralizer 44 to provide positioning stability for the RIT 10. The spring-blades 46 are compressed against the RIT 10 when it is engaged within the sub 30. Bolts 48 with O-ring seals 50 may be used to hold the centralizer(s) 44 in the sub 30 while preserving the pressure barrier between the ID and the OD of the sub 30.

Figure 16:
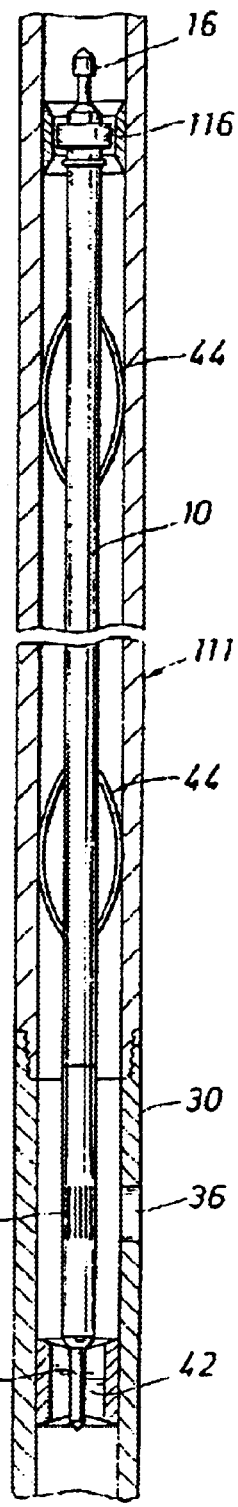
FIG. 16 is a schematic diagram of a run-in tool including a modulator engaged within a tubular member in accord with the invention.

Alternatively, the centralizer 44 may be mounted on the RIT 10 rather than on the sub 30 (See FIG. 16). In this case, the centralizer 44 may be configured to remain in a retracted mode during the trip down, and to open when the RIT 10 lands in the sub 30. It will be understood that other centralizer 44 configurations may be implemented with the invention as known in the art.

The RIT 10 and sub 30 have EM properties similar to a coaxial cable, with the RIT 10 acting as the inner conductor, and the sub 30 acting as the outer conductor of a coaxial cable. If the drilling mud is conductive, then the "coax" is lossy. If the drilling mud is oil based, the "coax" will have little attenuation. Parasitic antenna 12 coupling may take place inside of the sub 30 between receiver-receiver or transmitter-receiver. As described above, the shields 26 surrounding the antennas 12 are grounded to the mandrel of the RIT 10 to minimize capacitive and TEM coupling between them. Electrically balancing the antennas 12 also provides for TEM coupling rejection. The centralizers 44 may also be used as a means of contact to provide radio-frequency (rf) short-circuits between the RIT 10 and the sub 30 to prevent parasitic coupling. For example, small wheels with sharp teeth may be mounted on the centralizers 44 to ensure a hard short between the RIT 10 and the sub 30 (not shown).

Pressure Barrier. Since each slot 38 fully penetrates the wall of the sub 30, an insulating pressure barrier is used to maintain the differential pressure between the inside and the outside of the sub 30 and to maintain hydraulic integrity. There are a variety of methods for establishing a pressure barrier between the sub 30 ID and OD at the slotted station 36.

Turning to FIG. 7a, an embodiment of a sub 30 with a pressure barrier of the invention is shown. A cylindrical sleeve 52 is positioned within the central bore 32 of the sub 30 in alignment with the slot(s) 38. The sleeve 52 is formed of a material that provides transparency to EM energy. Useable materials include the class of polyetherketones described in U.S. Pat. No. 4,320,224, or other suitable resins. Victrex USA, Inc. of West Chester, Pa. manufactures one type called PEEK. Another usable compound is known as PEK. Cytec Fiberite, Greene Tweed, and BASF market other suitable thermoplastic resin materials. U.S. Pat. No. 6,300,762 (assigned to the present assignee) describes a class of polyaryletherketone-based materials that may be used to implement the invention. Another useable material is Tetragonal Phase Zirconia ceramic (TZP), manufactured by Coors Ceramics, of Golden, Colo. It will be appreciated by those skilled in the art that these and other materials may be combined to form a useable sleeve 52.

PEK and PEEK can withstand substantial pressure loading and have been used for harsh downhole conditions. Ceramics can withstand substantially higher loads, but they are not particularly tolerant to shock. Compositions of wound PEEK or PEK and glass, carbon, or KEVLAR may also be used to enhance the strength of the sleeve 52.

A retainer 54 and spacer 56 are included within the central bore 32 to support the sleeve 52 and provide for displacement and alignment with the slots 38. The sleeve 52 is positioned between the retainer 54 and spacer 56, which are formed as hollow cylinders to fit coaxially within the central bore 32. Both are preferably made of stainless steel. The retainer 54 is connected to the sleeve 52 at one end, with the sleeve 52 fitting coaxially inside the retainer 54. As the differential pressure increases within the ID of the sub 30 during operation, the sleeve 52 takes the loading, isolating the sub 30 from the pressure in the slotted region. Hydraulic integrity is maintained at the junction between the sleeve 52 and retainer 54 by an O-ring seal 53. A fitted "key" 55 is used to engage the sleeve 52 to the retainer 54, preventing one from rotating relative to the other (See FIG. 7a blow-up). An index pin 57 is fitted through the sub 30 and engaged to the free end of the retainer 54 to prevent the retainer from rotating within the bore 32 of the sub 30. O-rings 59 are also placed within grooves on the OD of the retainer 54 to provide a hydraulic seal between the retainer 54 and the sub 30.

In operation, the internal sleeve 52 will likely undergo axial thermal expansion due to high downhole temperatures. Thus, it is preferable for the sleeve 52 to be capable of axial movement as it undergoes these changes in order to prevent buckling. The spacer 56 consists of an inner cylinder 60 within an outer cylinder 62. A spring 64 at one end of the OD of the inner cylinder 60 provides an axial force against the outer cylinder 62 (analogous to an automotive shock absorber). The outer cylinder 62 is connected to the sleeve 52 using the key 55 and O-ring seal 53 at the junction as described above and shown in the blow-up in FIG. 7a. The spring-loaded spacer 56 accounts for differential thermal expansion of the components. The sub 30 embodiment of FIG. 7a is shown connected to other tubular members by threaded oilfield connections 70.

For purposes of illustration, a sub 30 with only one slot 38 is shown in FIG. 7a. Other embodiments may include several sleeves 52 interconnected in the described manner to provide individual pressure barriers over multiple slotted stations 36 (not shown). With this configuration, only two O-ring 53 seals to the ID of the sub 30 are used over the entire slotted array section. This minimizes the risk involved with dragging the O-rings 53 over the slots 38 during assembly or repair. FIG. 7b shows a cross-section of the sub 30 (along line A—A of FIG. 7a) with a three-slot 38 configuration.

Figure 8A:
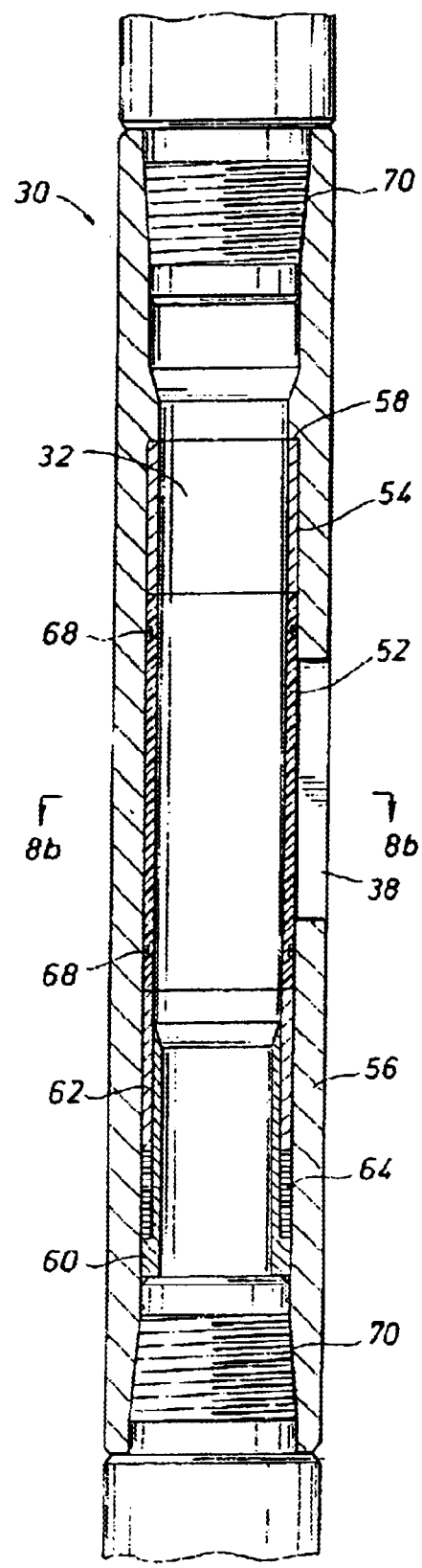
FIG. 8a is a cross-sectional view of a tubular member with another pressure barrier configuration in accord with the invention.
Figure 8B:
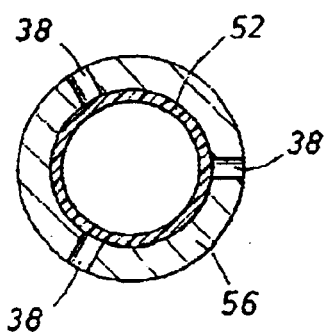
FIG. 8b is a cross-sectional view of a three-slotted tubular member of FIG. 8a along line B—B.

FIG. 8a shows another embodiment of a sub 30 with a pressure barrier of the invention. In this embodiment, the spring-loaded spacer 62 maintains the outer cylinder 62 abutted against the sleeve 52 and O-rings 68 are placed within grooves on the OD of the sleeve 52, preferably at both ends of the slot 38. The retainer 54 rests at one end against a shoulder or tab 58 formed on the wall of the central bore 32. FIG. 8b shows a cross-section of the sub 30 (along line B—B of FIG. 8a) with a three-slot 38 configuration.

In another embodiment of a pressure barrier of the invention, a sleeve 52 made out of PEEK or PEK, or glass, carbon, or KEVLAR filled versions of these materials, may be bonded to a metal insert (not shown), where the insert contains O-rings to seal against the sub 30 as described above. The metal insert could be mounted within the sub 30 as described above or with the use of fastener means or locking pins (not shown). The sleeve material may also be molded or wrapped onto the supporting insert. The fibers in the wrapped material can also be aligned to provide additional strength.

FIG. 9a shows another embodiment of a pressure barrier of the invention. In this embodiment, the cylindrical sleeve 52 is held in alignment with the slot(s) 38 by a metal retainer 72. The retainer 72 may be formed as a single piece with an appropriate slot 74 cut into it for signal passage as shown, or as independent pieces supporting the sleeve 52 at the top and bottom (not shown). The retainer 72 may be constrained from axial movement or rotation within the sub 30 by any of several means known in the art, including an index-pin mechanism or a keyed-jam-nut type arrangement (not shown). The slot 38 may also be filled with a protective insert as will be further described below. In operation, a RIT 10 is positioned within the sub 30 such that the antenna 12 is aligned with the slot(s) 38.

As shown in FIG. 9b, the retainer 72 is formed such that it extends into and reduces the ID of the sub 30 to constrain the RIT 10. Mudflow occurs through several channels or openings 76 in the retainer 72 and through the annulus 78 between the RIT 10 and the retainer 72. The retainer 72 in effect acts as a centralizer to stabilize the RIT 10 and to keep it from hitting the ID of the sub 30, lowering shock levels and increasing reliability.

FIG. 10 shows another embodiment of a pressure barrier of the invention. A sub 30 may be formed with a shop joint 80 so that the sleeve 52 can be inserted within the central bore 32. The sleeve 52 is formed as described above and provides a hydraulic seal using O-rings 82 within grooves at both ends on the OD of the sleeve 52. The sleeve 52 is restrained from axial movement within the central bore 32 by a lip 84 formed on one end of the two-piece sub 30 and by the end of the matching sub 30 joint. Since the sleeve 52 sits flush within a recess 86 in the ID of the sub 30, this configuration offers unrestricted passage to a large diameter RIT 10. This configuration also provides easy access to the sleeve 52 and slot(s) 38 for maintenance and inspection.

Turning to FIG. 11, another embodiment of a pressure barrier of the invention is shown. The slot 38 in the sub 30 is three-stepped, preferably with fully rounded ends. One of the steps provides a bearing shoulder 90 for an insert 92, and the other two surfaces form the geometry for an O-ring groove 94 in conjunction with the insert 92. A modified O-ring seal consists of an O-ring 96 stretched around the insert 92 at the appropriate step, with metal elements 98 placed on opposite sides of the O-ring 96. The metal elements 98 are preferably in the form of closed loops. The sleeve 52 may be fitted within the sub 30 with one or more O-rings (not shown) to improve hydraulic integrity as described above. As shown in FIG. 11, the sleeve 52 may also have a slot 100 penetrating its wall to provide an unobstructed channel for any incoming or outgoing signal. The sleeve 52 may have a matching slot 100 for every slot 38 in the sub 30.

The insert 92 and sleeve 52 are preferably made of the dielectric materials described above to permit the passage of EM energy. However, if the sleeve 52 is configured with a slot 100, the sleeve 52 may be formed from any suitable material.

If the sleeve 52 is configured with a slot 100, the internal pressure of the sub 30 may push the insert 92 outward. The bearing shoulder 90 takes this load. As the internal pressure increases, the O-ring 96 pushes the metal elements 98 against an extrusion gap, which effectively closes off the gap. As a result, there is no room for extrusion of the O-ring 96. Since the metal is much harder than the O-ring material, it does not extrude at all. The modified geometry therefore creates a scenario where a soft element (the O-ring) provides the seal and a hard element (the metal loop) prevents extrusion, which is the ideal seal situation. In the event of pressure reversal, the sleeve 52 captures the insert 92 in the slot 38, preventing the insert 92 from being dislodged.

Other pressure barrier configurations may be implemented with the invention. One approach is the use of several individual sleeves 52 connected together by other retaining structures and restrained by a pressure-differential seal or a jam-nut arrangement (not shown). Another approach is the use of a long sleeve 52 to span multiple slotted stations 38 (not shown). Still another approach is the use of a sleeve 52 affixed to the OD of the sub 30 over the slotted region, or a combination of an interior and exterior sleeve (discussed below).

Slot Inserts. While the slotted stations of the invention are effective with fully open and unblocked slots 38, the operational life of the assembly may be extended by preventing debris and fluids from entering and eroding the slots 38 and the insulating sleeve 52. The slots 38 could be filled with rubber, an epoxy-fiberglass compound, or another suitable filler material to keep fluids and debris out while permitting signal passage.

Figure 12A:
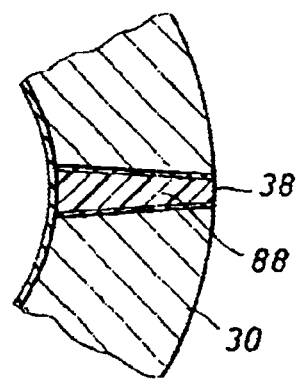
FIGS. 12a and 12b are cross-sectional views and cutaway perspectives of a slotted tubular station with a tapered slot and a corresponding tapered insert in accord with the invention.
Figures 2, 12B:
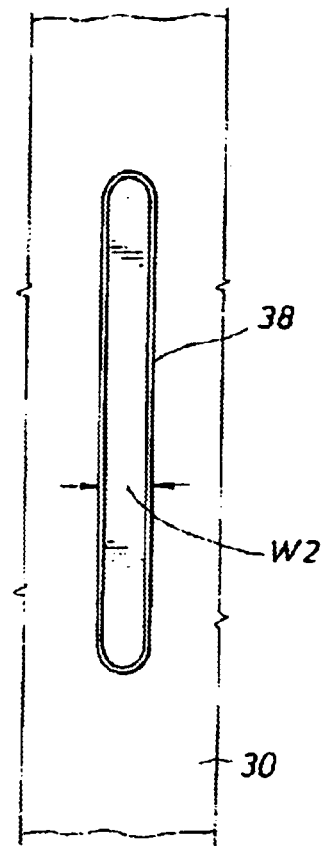
Figures 1, 12B:
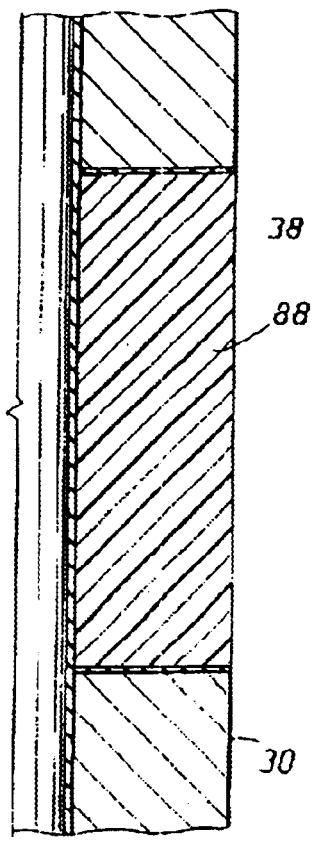
Figures 3, 12B:
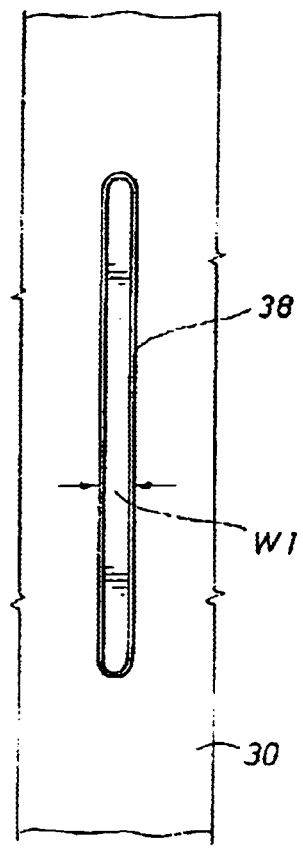

An embodiment of a sub 30 with a tapered slot 38 is shown in FIG. 12a. The slot 38 is tapered such that the outer opening $W_1$ is narrower than the inner opening $W_2$, as shown in FIG. 12b. A tapered wedge 88 of insulating material (e.g., fiberglass epoxy) is inserted within the tapered slot 38. The wedge 88 may be bonded into the sub 30 with rubber. The rubber layer surrounds the wedge 88 and bonds it into the sub 30. An annulus of rubber may also be molded on the interior and/or exterior surface of the sub 30 to seal the wedge 88 within the slot 38.

Focusing Shield Structures. Measurements of the attenuation of the TE radiation from a simple coil-wound antenna 12 through a single slot 38 of reasonable dimensions show that the TE field is notably attenuated. This attenuation can be reduced, however, by using shielding around the antenna 12 to focus the EM fields into the slot 38.

Figure 13A:
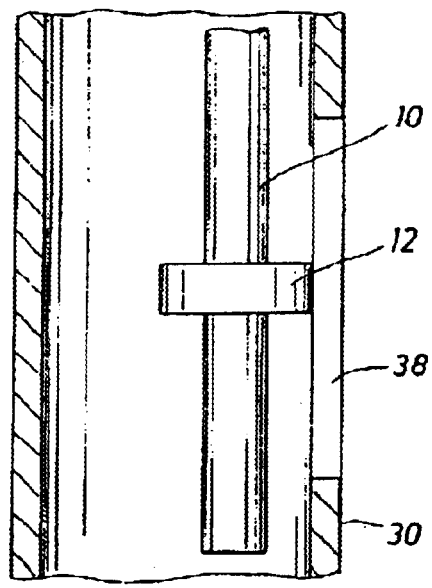
FIG. 13a is a schematic diagram of a run-in tool and antenna eccentered within a tubular member in accord with the invention.

Turning to FIG. 13a, an antenna 12 consisting of 25 turns of wire on a 1.75-inch diameter bobbin was mounted on a 1-inch diameter metal RIT 10 and positioned fully eccentered radially inside the bore of a 3.55-inch ID, 6.75-inch OD sub 30 against the slot 38 and centered vertically on the slot 38. The measured attenuation of the TE field between 25 kHz 2 MHz was a nearly constant 16.5 dB.

Figure 13B:
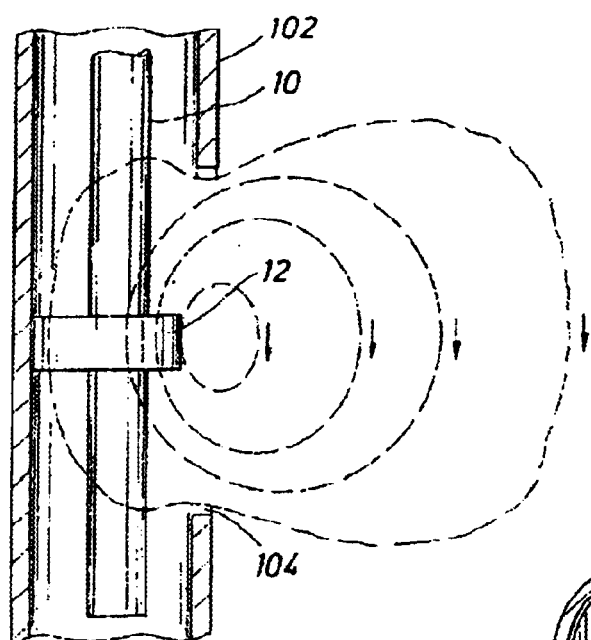
FIGS. 13b and 13c are schematic diagrams of a run-in tool and antenna surrounded by a focusing shield and respectively showing the shield's effect on the magnetic and electric fields in accord with the invention.

Turning to FIG. 13b, the same measurement was performed with the antenna 12 inside a thin shield 102 formed of a metallic tube with a 0.5-inch wide, 6-inch long slot 104 aligned with the slot 38 in the sub 30 (not shown). The antenna 12 was fully surrounded by the shield 102 except for the open slot 104 and placed inside the sub 30.

Figure 13C:
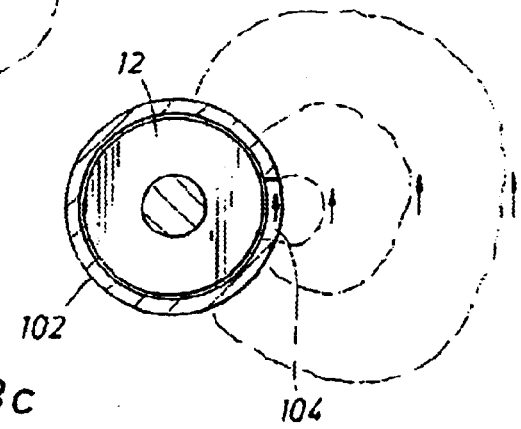

The attenuation with this assembly in the same sub 30 was 11.8 dB, a reduction of the attenuation of nearly 5 dB. FIGS. 13b and 13c respectively show how the shield 102 affects the magnetic and electric fields. The attenuation due to this shield 102 alone is minimal.

Figure 14:
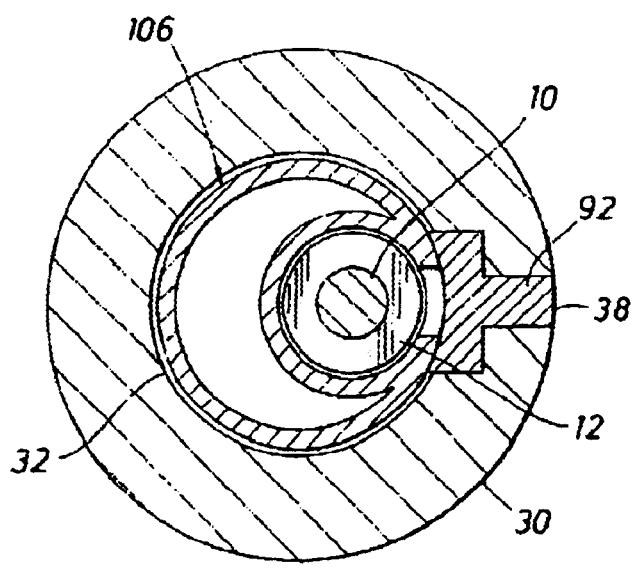
FIG. 14 is a top view of a shielding structure formed within the bore of the tubular member in accord with the invention.

FIG. 14 shows another embodiment of a shielding structure of the invention. In this embodiment, the central bore 32 of the sub 30 is configured with a bracket structure 106 that serves as a focusing shield by surrounding the antenna 12 when the RIT 10 is engaged within the sub 30.

Figure 15:
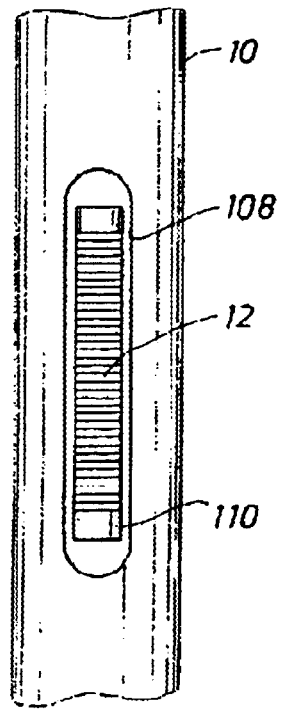
FIG. 15 is a schematic diagram of a shielding structure formed by a cavity within the run-in tool in accord with the invention.

FIG. 15 shows another embodiment of a shielding structure of the invention. The mandrel of the RIT 10 has a machined pocket or cavity 108 in its body. A coil antenna 12 wound on a bobbin 110 made of dielectric material is mounted within the cavity 108. A ferrite rod may replace the dielectric bobbin 110. With this configuration, the body of the RIT 10 itself serves as a focusing shield. The hydraulic integrity of the RIT 10 is maintained by potting the antenna 12 with fiberglass-epoxy, rubber, or another suitable substance. The attenuation of a coil antenna 12 having 200 turns on a 0.875-inch diameter bobbin was measured for this assembly mounted the same way as described above in the same sub 30. The measured attenuation was only ~7 dB. It will be appreciated by those skilled in the art that other types of sources/sensors may be housed within the cavity 108 of the RIT 10.

RIT/Sub Configurations. FIG. 16 shows another embodiment of the invention. A sub 30 of the invention is connected to another tubular 111 forming a section of a drillstring. The RIT 10 includes an antenna 12, a stinger 14 at the lower end, and a fishing head 16 at the top end. The stinger 14 is received by the landing shoe 42 on the sub 30, which serves to align the antenna 12 with the slotted station 36. As above, the RIT 10 of this embodiment includes various electronics, batteries, a downhole processor, a clock, a read-out port, memory, etc. (not shown) in a pressure housing. The RIT 10 may also incorporate various types of sources/sensors as known in the art.

RIT with Modulator. The RIT 10 of FIG. 16 is also equipped with a modulator 116 for signal communication with the surface. As known in the art, a useable modulator 116 consists of a rotary valve that operates on a continuous pressure wave in the mud column. By changing the phase of the signal (frequency modulation) and detecting these changes, a signal can be transmitted between the surface and the RIT 10. With this configuration, one can send the RIT 10 through the drillstring to obtain measurement data (e.g., resistivity or gamma-ray counts) of formation characteristics and to communicate such data to the surface in real-time. Alternatively, all or some of the measurement data may be stored downhole in the RIT 10 memory for later retrieval. The modulator 116 may also be used to verify that the RIT 10 is correctly positioned in the sub 30, and that measurements are functioning properly. It will be appreciated by those skilled in the art that a modulator 116 assembly may be incorporated with all of the RIT/sub implementations of the invention.

Figure 17:
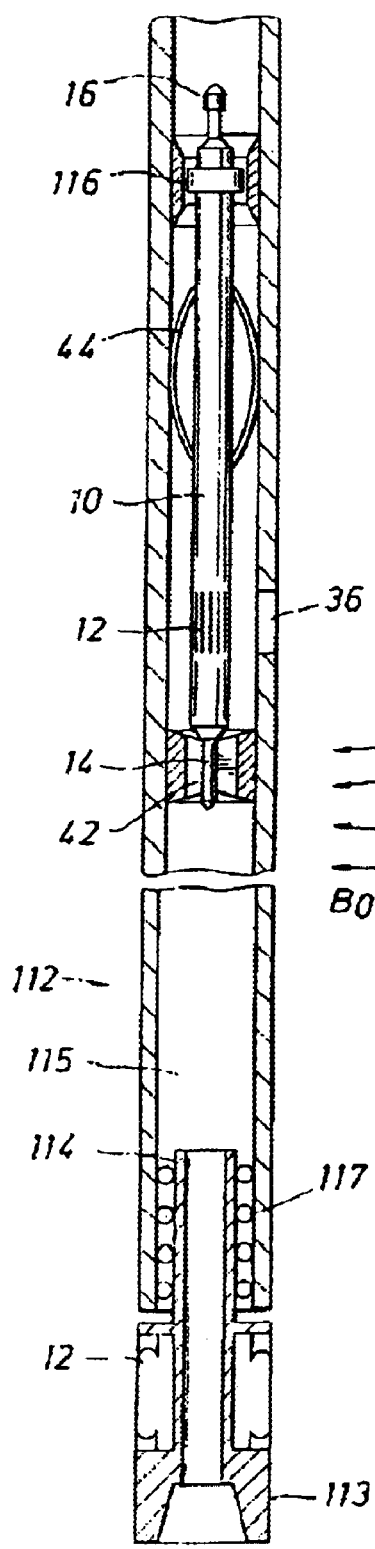
FIG. 17 is a schematic diagram of the run-in tool configuration of FIG. 16 as used for real-time wireless communication with a remote downhole tool in accord with invention.

FIG. 17 shows another embodiment of the invention. The subs 30 and RITs 10 of the invention may be used to communicate data and/or instructions between the surface and a remote tool 112 located along the drill string. For purposes of illustration, the tool 112 is shown with a bit box 113 at the bottom portion of a drive shaft 114. The drive shaft 114 is connected to a drilling motor 115 via an internal transmission assembly (not shown) and a bearing section 117. The tool 112 also has an antenna 12 mounted on the bit box 113. The motor 11 S rotates the shaft 114, which rotates the bit box 113, thus rotating the antenna 12 during drilling.

With the configuration of FIG. 17, the RIT 10 may be engaged within the sub 30 at the surface or sent through the drill string when the sub 30 is at a desired downhole position. Once engaged, a wireless communication link may be established between the antenna 12 on the RIT 10 and the antenna 12 on the tool 112, with the signal passing through the slotted station 36. In this manner, real-time wireless communication between the surface and the downhole tool 112 may be established. It will be appreciated by those skilled in the art that other types of sensors and/or signal transmitting/receiving devices may be mounted on various types of remote tools 112 for communication with corresponding devices mounted on the RIT 10.

Nuclear Magnetic Resonance Sensing. It is known that when an assembly of magnetic moments such as those of hydrogen nuclei are exposed to a static magnetic field they tend to align along the direction of the magnetic field, resulting in bulk magnetization. By measuring the amount of time for the hydrogen nuclei to realign their spin axes, a rapid nondestructive determination of porosity, movable fluid, and permeability of earth formations is obtained. See A. Timur, *Pulsed Nuclear Magnetic Resonance Studies of Porosity, Movable Fluid, and Permeability of Sandstones*, Journal of Petroleum Technology, June 1969, p. 775. U.S. Pat. No. 4,717,876 describes a nuclear magnetic resonance well logging instrument employing these techniques.

Figure 18:
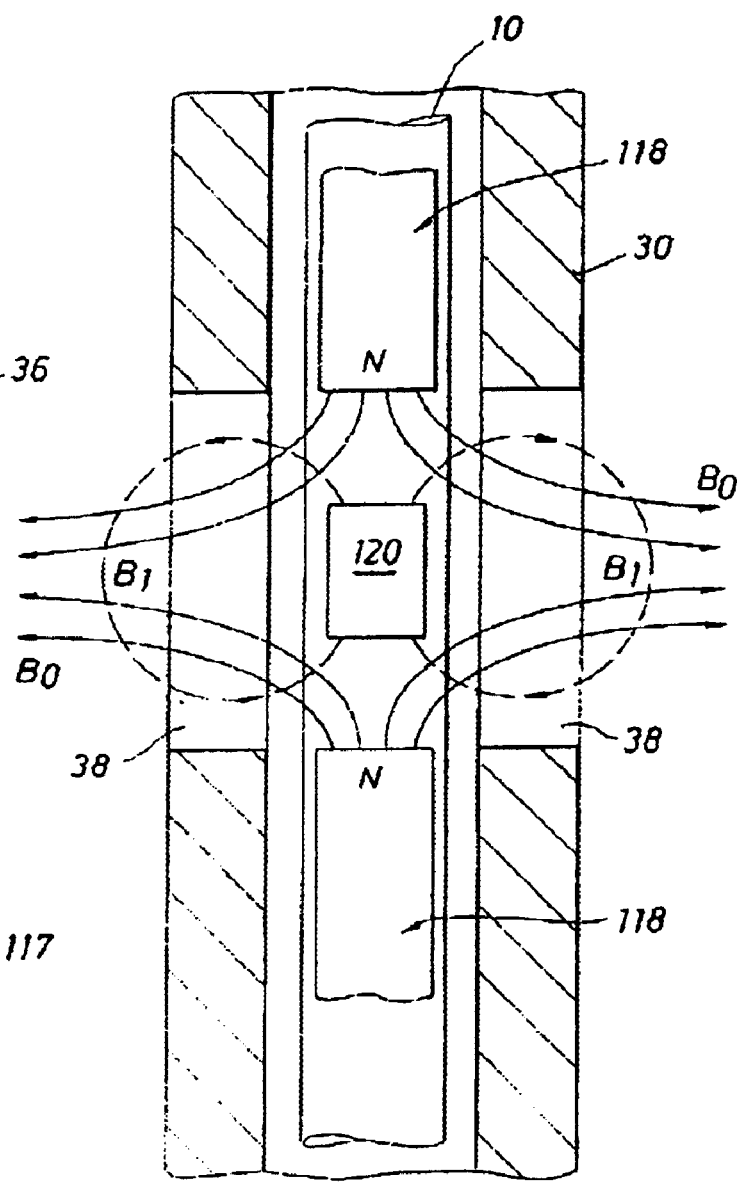
FIG. 18 is a schematic diagram of a run-in tool configuration for porosity measurements utilizing magnetic nuclear resonance techniques in accord with the invention.

A determination of formation porosity from magnetic resonance may be obtained with a non-magnetic sub 30 of the invention as shown in FIG. 18. The sub 30 can be formed of the typical high-strength non-magnetic steel used in the industry. The RIT 10 contains the electronics, batteries, CPU, memory, etc., as described above. Opposing permanent magnets 118 contained in the RIT 10 provide the magnetic field. A rf coil 120 is mounted between the magnets 118 for generating a magnetic field in the same region to excite nuclei of the formation vicinity. The design of the rf coil 120 is similar to the antennas 12 described above in being a multi-turn loop antenna with a central tube for through wires and mechanical strength. The permanent magnets 118 and rf coil 120 are preferably housed in a non-magnetic section of the sub 30 that has axial slots 38 with a pressure barrier (not shown) of the invention.

With a non-magnetic sub 30, the static magnetic fields $B_0$ from the permanent magnets 118 penetrate into the surrounding formation to excite the nuclei within the surrounding formation. The coil 120 in the RIT 10 provides a rf magnetic field $B_1$, which is perpendicular to $B_0$ outside of the sub 30. The rf coil 120 is positioned in alignment with the axial slot(s) 38 in the sub 30.

A magnetic resonance measurement while tripping may be more complicated in comparison to propagation resistivity measurements due to various factors, including: an inherently lower signal-to-noise ratio, permanent magnet form factors, rf coil efficiency, high Q antenna tuning, high power demands, and a slower logging speed.

Gamma-Ray Measurement. It is known that gamma ray transport measurements through a formation can be used to determine its characteristics such as density. The interaction of gamma rays by Compton scattering is dependent only upon the number density of the scattering electrons. This in turn is directly proportional to the bulk density of the formation. Conventional logging tools have been implemented with detectors and a source of gamma rays whose primary mode of interaction is Compton scattering. See U.S. Pat. No. 5,250,806, assigned to the present assignee. Gamma ray formation measurements have also been implemented in LWT technology. See *Logging while tripping cuts time to run gamma ray*, Oil & Gas Journal, June 1996, pp. 65–66.

The present invention may be used to obtain gamma-ray measurements as known in the art, providing advantages over known implementations.

The subs 30 of the invention provide the structural integrity required for drilling operations while also providing a low-density channel for the passage of gamma rays. Turning to FIG. 4b, this configuration is used to illustrate a gamma-ray implementation of the invention. In this implementation, a RIT 10 is equipped with a gamma-ray source and gamma-ray detectors (not shown) of the type known in the art and described in the '806 patent. The antennas 12 of FIG. 4b would be replaced with a gamma-ray source and gamma-ray detectors (not shown).

Two gamma-ray detectors are typically used in this type of measurement. The gamma-ray detectors are placed on the RIT 10 at appropriate spacings from the source as known in the art. The slotted stations 36 are also appropriately placed to match the source and detector positions of the RIT 10. Calibration of the measurement may be required to account for the rays transmitted along the inside of the sub 30. The gamma-ray detectors may also be appropriately housed within the RIT 10 to shield them from direct radiation from the source as known in the art.

Turning to FIG. 14, this configuration is used to illustrate another gamma-ray implementation of the invention. With the RIT 10 equipped with the described gamma-ray assembly and eccentered toward the slots 38, this configuration will capture the scattered gamma rays more efficiently and provide less transmission loss.

Resistivity Measurement. The invention may be used to measure formation resistivity using electromagnetic propagation techniques as known in the art, including those described in U.S. Pat. Nos. 5,594,343 and 4,899,112 (both assigned to the present assignee). FIGS. 19a and 19b show two RIT 10/sub 30 configurations of the invention. A pair of centrally located receiver antennas Rx are used to measure the phase shift and attenuation of EM waves. Look-up tables may be used to determine phase shift resistivity and attenuation resistivity. Transmitter antennas Tx are placed above and below the receiver antennas Rx, either in the configuration shown in FIG. 19a, which has two symmetrically placed transmitter antennas Tx, or in the configuration shown in FIG. 19b, which has several transmitter antennas Tx above and below the receiver antennas Rx. The architecture of FIG. 19a can be used to make a borehole compensated phase-shift and attenuation resistivity measurement, while the multiple Tx spacings of FIG. 19b can measure borehole compensated phase-shift and attenuation with multiple depths of investigation. It will be appreciated by those skilled in the art that other source/sensor configurations and algorithms or models may be used to make formation measurements and determine the formation characteristics.

Inductively-Coupled R/T/Sub. Turning to FIG. 20, other embodiments of a sub 30 and RIT 10 of the invention are shown. The sub 30 contains one or more integral antennas 12 mounted on the OD of the elongated body for transmitting and/or receiving electromagnetic energy. The antennas 12 are embedded in fiberglass epoxy, with a rubber overmolding as described above. The sub 30 also has one or more inductive couplers 122 distributed along its tubular wall.

The RIT 10 has a small-diameter pressure housing such as the one described above, which contains electronics, batteries, downhole processor, clocks, read-out port, recording memory, etc., and one or more inductive couplers 122 mounted along its body.

Figure 21A:
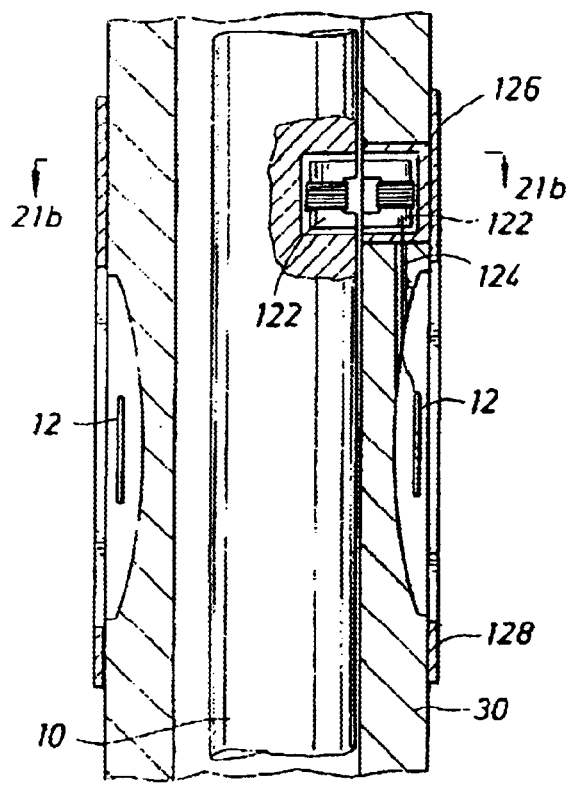
FIG. 21 shows a top view and a schematic diagram of an eccentered run-in tool and tubular member with inductive couplers in accord with the invention.
Figure 21B:
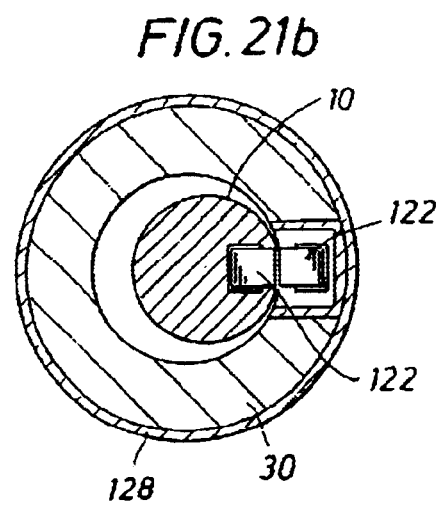

As shown in FIG. 21, the RIT 10 is eccentered inside the sub 30 so that the inductive coupler(s) 122 in the RIT 10 and the inductive coupler(s) 122 in the sub 30 are in close proximity. The couplers 120 consist of windings formed around a ferrite body as known in the art. Feed-throughs 124 connect the antenna 12 wires to the inductive coupler 122 located in a small pocket 126 in the sub 30. A metal shield 128 with vertical slots covers each antenna 12 to protect it from mechanical damage and provide the desired electromagnetic filtering properties as previously described. Correctly positioning the RIT 10 inside the sub 30 improves the efficiency of the inductive coupling. Positioning is accomplished using a stinger and landing shoe (See FIG. 4a) to eccenter the RIT 10 within the sub 30. It will be appreciated by those skilled in the art that other eccentering systems may be used to implement the invention.

Figure 22A:
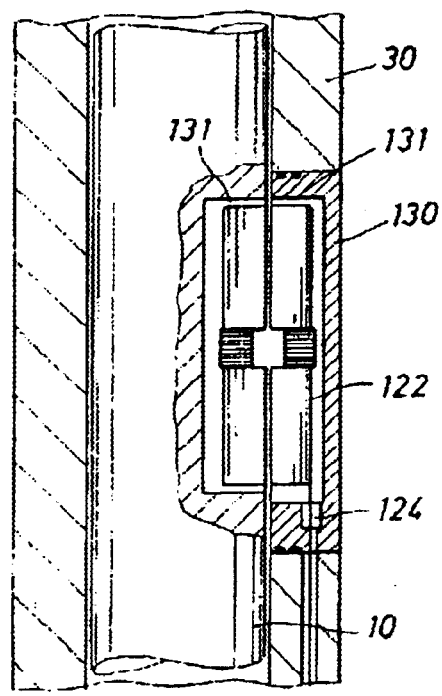
FIGS. 22a and 22b are schematic diagrams of an inductive coupler configuration within a run-in tool and tubular member in accord with the invention.

As shown in FIG. 22a, the inductive couplers 122 have "U" shaped cores made of ferrite. The ferrite core and windings are potted in fiberglass-epoxy, over molded with rubber 131, and mounted within a coupler package 130 formed of metal. The coupler package 130 may be formed of stainless steel or a non-magnetic metal. Standard Oring seals 132 placed around the inductive coupler package 130 provide a hydraulic seal. The inductive couplers 122 in the RIT 10 may also be potted in fiberglass-epoxy and over molded with rubber 131. A thin cylindrical shield made of PEEK or PEK may also be placed on the OD of the sub 38 to protect and secure the coupler package 130 (not shown).

In operation, there will be a gap between the inductive couplers 122 in the RIT 10 and the sub 30, so the coupling will not be 100% efficient. To improve the coupling efficiency, and to lessen the effects of mis-alignment of the pole faces, it is desirable for the pole faces to have as large a surface area as possible.

Figure 22B:
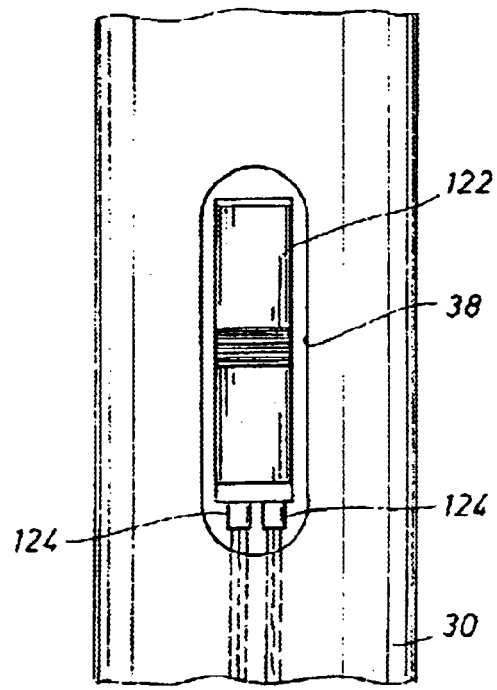

FIG. 22b shows a 3.75-inch long by 1-inch wide slot 38 in the sub 30. The pole face for this inductive coupler 122 is 1.1-inches long by 0.75-inch wide, giving an overlap area of 0.825 square inches. This configuration maintains a high coupling efficiency and reduces the effects due to the following: movement of the RIT 10 during drilling or tripping, variations in the gap between the inductive couplers 122, and variations in the angle of the RIT 10 with respect to the sub 30. Another advantage of a long slot 38 design is that it provides space for the pressure feed-throughs 124 in the inductive coupler package 130.

Antenna tuning elements (capacitors) may also be placed in this package 130 if needed. It will be appreciated by those skilled in the art that other aperture configurations may be formed in the walls of the sub 30 to achieve the desired inductive coupling, such as the circular holes shown in FIG. 20.

Figure 23:
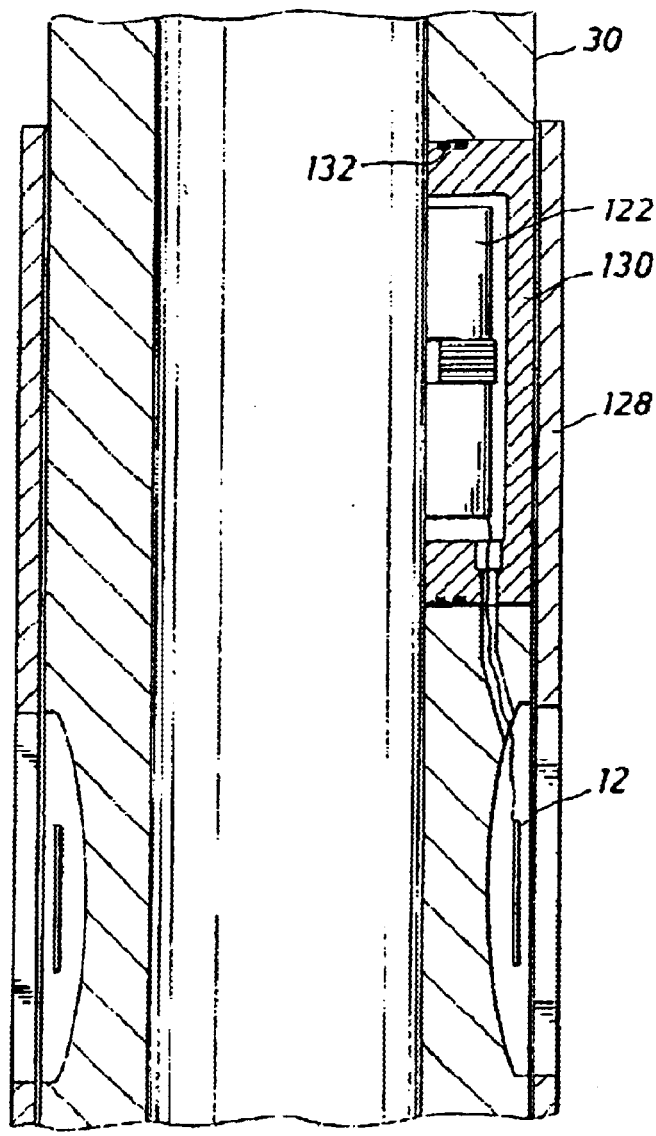
FIG. 23 is a cross-sectional view of an inductive coupler and shield configuration mounted within a tubular member in accord with the invention.

Since the pressure inside the sub 30 will be 1–2 Kpsi higher than outside the sub 30 in most cases, the inductive coupler package 130 should be mechanically held in place. Turning to FIG. 23, the antenna shield 128 can be used to retain the inductive coupler package 130 in place. The shield 128 having slots over the antenna 12 as described above, but solid elsewhere. The solid portion retains the inductive coupler package 130 and takes the load from the differential pressure drop. Tabs may also be placed on the outside of the inductive coupler package 130 to keep it from moving inward (not shown). The shield 128 may also be threaded on its ID, with the threads engaging matching "dogs" on the sub 30 (not shown).

Figure 24:
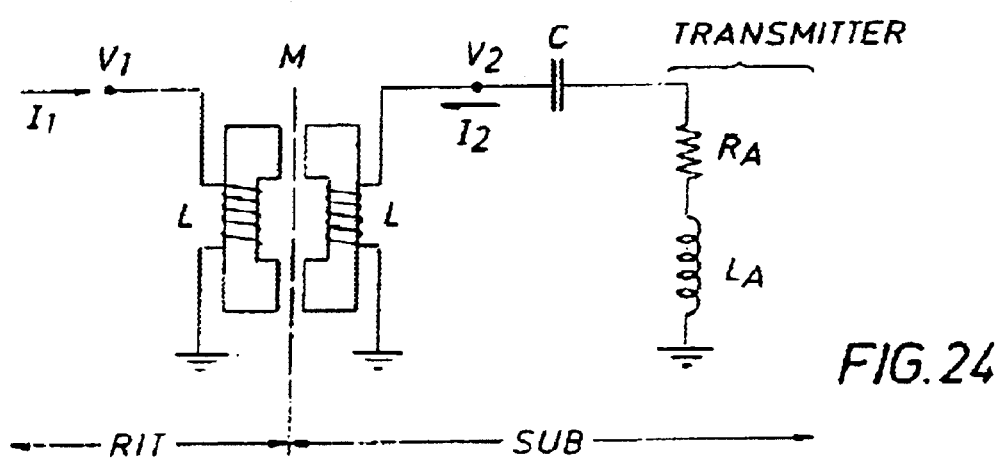
FIG. 24 is a schematic diagram of a simplified inductive coupler circuit in accord with the invention.

FIG. 24 shows a simple circuit model for an embodiment of the inductive coupler and transmitter antenna of the invention. On the RIT 10 side, the current is $I_1$, and the voltage is $V_1$. On the sub 30 side, the current is $I_2$ and the voltage is $V_2$. The mutual inductance is M, and the self-inductance of each half is L. This inductive coupler is symmetric with the same number of turns on each half. With the direction of $I_2$ defined in FIG. 24, the voltage and currents are related by $V_1=j\omega LI_1+j\omega MI_2$ and $V_2=j\omega MI_1+j\omega LI_2$. The antenna impedance is primarily inductive ($L_A$) with a small resistive part ($R_A$), $Z_A=R_A+j\omega L_A$. Typically the inductive impedance is about 100Ω, while the resistive impedance is about 10Ω. A tuning capacitor (C) may be used to cancel the antenna inductance, giving a RIT side impedance $Z_2=R_A+j\omega L_A-j/\omega C\sim R_A$. The ratio of the current delivered to the antenna to the current driving the inductive coupler is $I_2/I_1=-j\omega M/(j\omega L+R_A+j\omega L_A j/\omega C)$. The inductive coupler has many turns and a high permeability core, so $L>>L_A$ and $\omega L>>>R_A$. To good approximation, $I_2/I_1=\sim-M/L$ (the sign being relative to the direction of current flow in FIG. 24).

Implementations. As described above, the RIT 10 may be equipped with internal data storage means such as conventional memory and other forms of the kind well known in the art or subsequently developed. These storage means may be used to communicate data and/or instructions between the surface and the downhole RIT 10. Received signal data may be stored downhole within the storage means and subsequently retrieved when the RIT 10 is returned to the surface. As known in the art, a computer (or other recording means) at the surface keeps track of time versus downhole position of the sub so that stored data can be correlated with a downhole location. Alternatively, the signal data and/or instructions may be communicated in real-time between the surface and the RIT 10 by LWD/MWD telemetry as known in the art (including EMAG telemetry).

Figure 25:
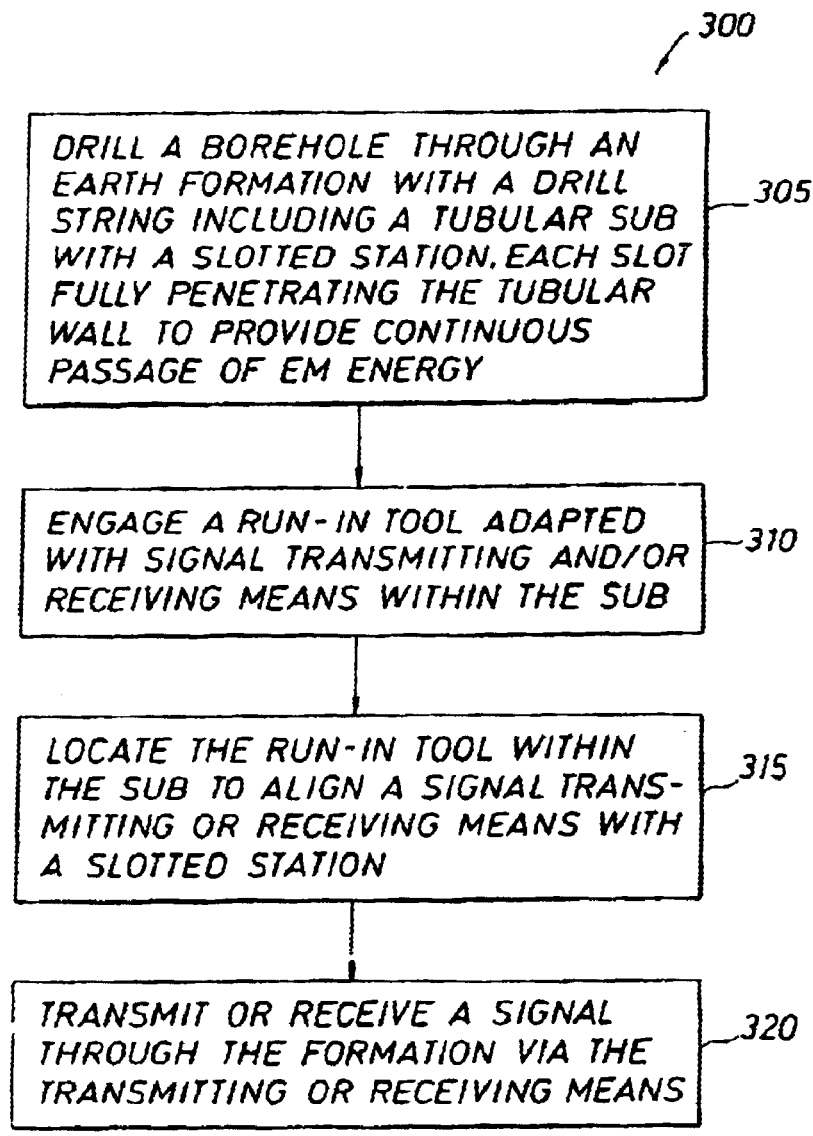
FIG. 25 is a flow chart illustrating a method for transmitting and/or receiving a signal through an earth formation in accord with the invention.

FIG. 25 illustrates a flow diagram of a method 300 for transmitting and/or receiving a signal through an earth formation in accord with the invention. The method comprises drilling a borehole through the earth formation with a drill string, the drill string including a sub having an elongated body with tubular walls and including at least one station having at least one slot formed therein, each at least one slot fully penetrating the tubular wall to provide a continuous channel for the passage of electromagnetic energy 305; engaging a run-in tool within the sub, the run-in tool being adapted with signal transmitting means and/or signal receiving means 310; locating the run-in tool within the sub such that at least one signal transmitting or receiving means is aligned with at least one slotted station on the sub 315; and transmitting or receiving a signal through the formation, respectively via the transmitting or receiving means 320.

Figure 26:
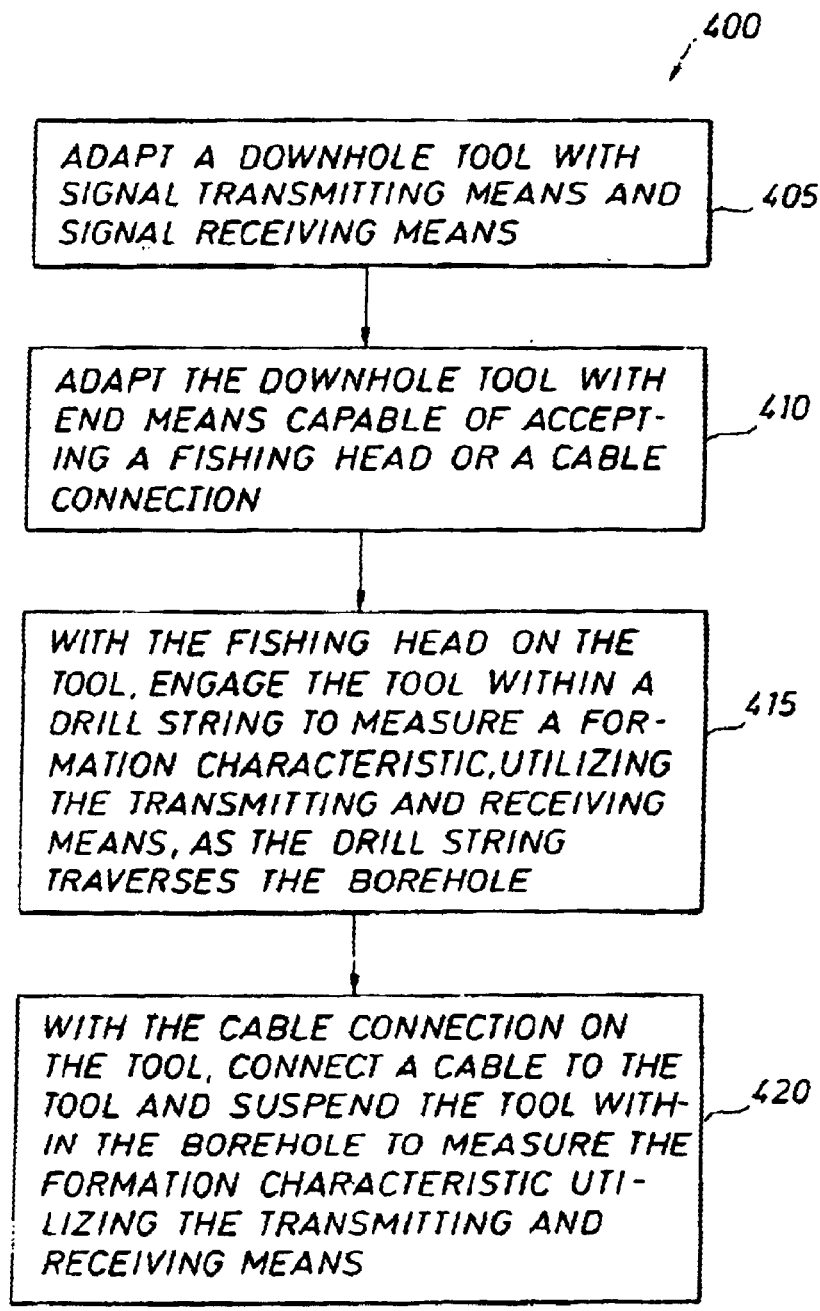
FIG. 26 is a flow chart illustrating a method for measuring a characteristic of an earth formation surrounding a borehole in accord with the invention.

FIG. 26 illustrates a flow diagram of a method 400 for measuring a characteristic of an earth formation surrounding a borehole in accord with the invention. The method comprises adapting a downhole tool with at least one signal transmitting means and at least one signal receiving means 405; adapting the downhole tool with end means capable of accepting a fishing head or a cable connection 410; and with the fishing head on the tool, engaging the tool within a drill string to measure the formation characteristic, utilizing the transmitting and receiving means, as the drill string traverses the borehole; with the cable connection on the tool, connecting a cable to the tool and suspending the tool within the borehole to measure the formation characteristic utilizing the transmitting and receiving means 420.

The method 400 of FIG. 26 may be implemented with the run-in tools 10 and subs 30 of the invention. The run-in tool may be configured with an end segment or cap (not shown) adapted to receive the previously described fishing head or a cable connection. With the fishing head connected to the run-in tool, the tool may be used in accord with the disclosed implementations. With the cable connection, the run-in tool may be used as a memory-mode wireline tool.

It will be understood that the following methods for sealing an opening or slot on the surface of a tubular are based on the disclosed pressure barriers and slot inserts of the invention.

Figure 27:
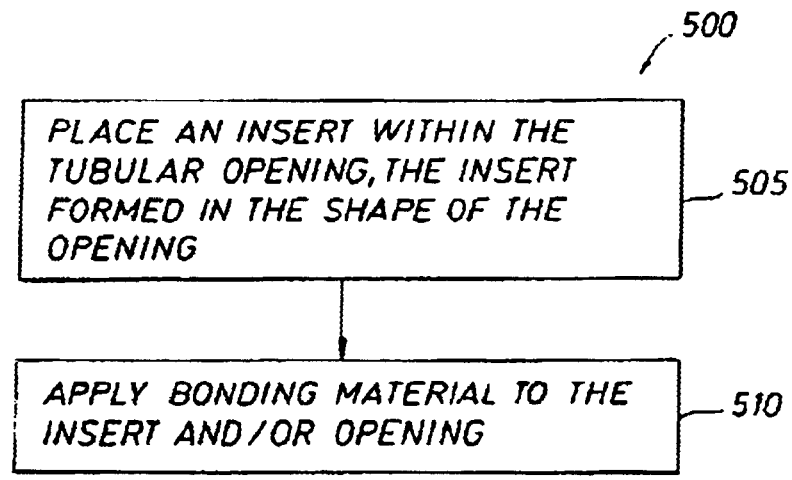
FIG. 27 is a flow chart illustrating a method for sealing an opening on the surface of a tubular member in accord with the invention.

FIG. 27 illustrates a flow diagram of a method 500 for sealing an opening on the surface of a tubular, wherein the tubular has an elongated body with tubular walls and a central bore. The method comprises placing an insert within the opening, the insert being formed in the shape of the opening 505; and applying a bonding material to the insert and/or opening to bond the insert within the opening 510.

Figure 28:
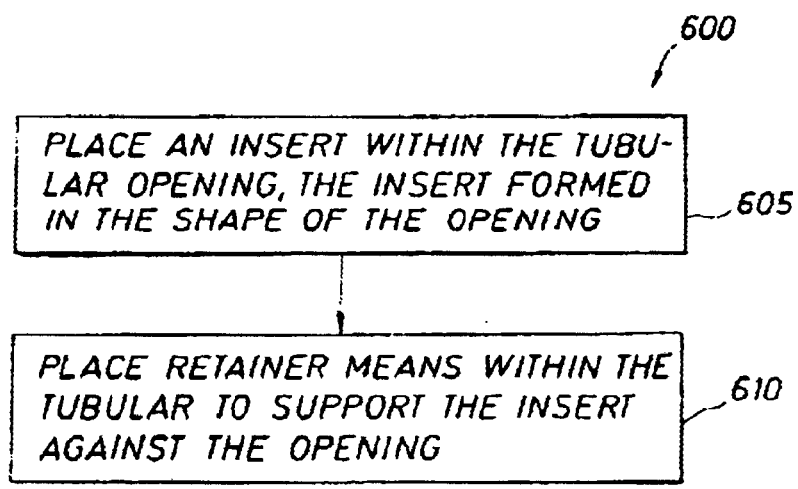
FIG. 28 is a flow chart illustrating a method for sealing a fully penetrating opening on a surface of a tubular member in accord with the invention.

FIG. 28 illustrates a flow diagram of a method 600 for sealing a fully penetrating opening on the surface of a tubular having an elongated body with tubular walls and a central bore. The method comprises placing an insert within the opening, the insert being formed in the shape of the opening 605, and placing retainer means within the tubular to support the insert against the opening 610.

Figure 29:
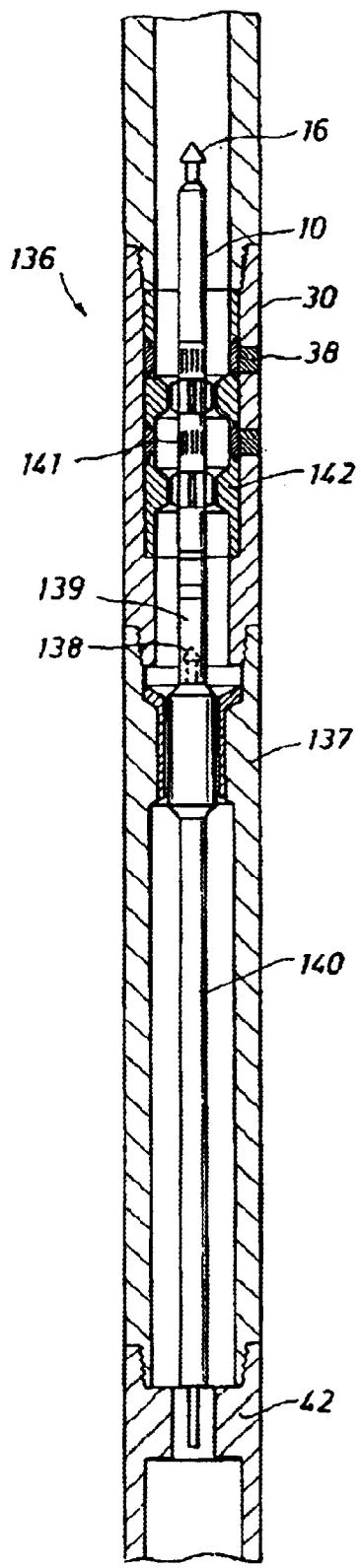
FIG. 29 shows a run-in tool within a slotted tubular member in combination with an independent MWD apparatus housed within a drill collar segment in accord with the invention.

The invention may also be implemented in combination with conventional retrievable and re-seatable MWD apparatus known in the art. One such apparatus is known as the SLIMPULSE (mark of Schlumberger) tool. These are retrievable MWD tools that are disposed within the drill collar and used to make various measurements while drilling. These apparatus typically include a fishing head at the upper end for retrieval from the drill collar without having to pull out the drill string. By incorporating a sub of the invention into the BHA, an RIT of the invention can be used in combination with these retrievable apparatus without compromising the retrievability or reseatability of such apparatus. FIG. 29 shows such an embodiment of the invention.

FIG. 29 shows the slotted sub 30 interconnected within and forming part of the drill string 136. The RIT 10 is shown disposed within the sub. This particular embodiment of the RIT 10 is equipped with selectively releasable engagement means at both its upper and lower ends. A fishing head 16 protrudes from the upper end. At the lower end, the RIT 10 includes an "overshot tool" 138, which is used to engage with and connect to a fishing head as known in the art. One or more spacers 139 or extensions are also attached to the lower end of the RIT to adjust its length as described below. The spacers 139 are simple pieces of pipe of various lengths with male thread on one end and female on another as known in the art.

An independent retrievable apparatus 140 is also disposed within a collar 137 in the drill string and connected to the lower end of the RIT 10. The apparatus 140 may consist of any conventional retrievable instrument (as described above) or other types of downhole apparatus designed for use within the drill collar as known in the art. The apparatus 140 is equipped with a stinger at the lower end and mounted within a landing shoe 42 or sleeve configured in the collar 137 similar to the embodiment shown in FIG. 16. At the upper end, the apparatus 140 is equipped with a fishing head 16, which engages with the overshot tool 138 at the lower end of the RIT 10. The apparatus 140 may be equipped with a modulator and sources or sensors to obtain desired measurements (not shown).

Figure 30:
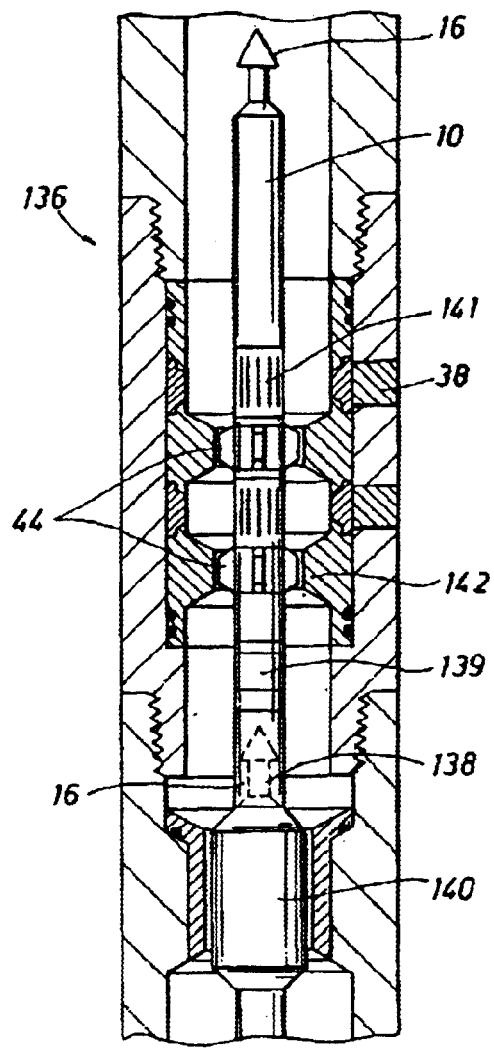
FIG. 30 shows an expanded view of the junction between the run-in tool and apparatus of FIG. 29.

FIG. 30 shows a more detailed view of the embodiment of FIG. 29. The RIT 10 is shown equipped with a source or sensor 141 as described herein. The RIT is equipped with the pressure barrier means 142 of the invention to provide the desired sealing at the slot(s) 38. The RIT 10 may also be equipped with one or more clamp-on centralizers 44 or drifts to position and maintain the RIT centered within the sub 30 once the RIT is seated in the sub. The centralizers 44 are preferably positioned on the RIT so that they correspond in axial location to the constrictions in the sub 30 having a slightly larger bore than the centralizer. Those skilled in the art will recognize that the centralizer(s) 44 may be affixed or mounted to the RIT 10 in any suitable manner.

In operation, the sub 30 is assembled above the collar adapted to house the apparatus 140. The apparatus 140 is then inserted into the collar 137 and fixed into its orientation and landing shoe 42. Axial alignment of RIT 10 within the sub 30 is ensured by a simple calculation that yields the proper distance between the RIT source/sensor 141 and apparatus 140 fishing head 16. The axial distance between the fishing head 16 and the sub's slot array 38 is determined prior to tripping the BHA into the hole. The drill string, with the sub 30 in the BHA, is then disposed within the hole for drilling. Alternatively, the apparatus 140 may also be pumped down or shuttled into the drill string on cable means after the drill collar is disposed into the hole.

The RIT 10 is then adapted for transit through the drill string for engagement within the sub 30. The axial spacers 139 are attached to the lower end of the RIT 10 as needed to make up the proper amount of axial length to allow the source/sensor 141 to align with the sub slot(s) 38 (determined from the measurement made during assembly of the BHA). An overshot tool 138 is placed below the spacer(s) 139. The overshot tool lands and engages with the fishing head on the apparatus. The overshot tool 138 may be configured with a sheareable pin assembly adapted to shear when a specific stress or tension is applied, such as when an upward pull or downward push is applied (not shown). The overshot 138 thus forms a selectively releasable connection between the RIT 10 and the apparatus 140. Innicor Subsurface Technologies Inc. of Canada manufactures a tool known as the CJC PULLING TOOL that may be used to implement the overshot tool 138 of the invention. Further information regarding Innicor's tools may be found at http://www.innicor.com.

Once the desired depth has been reached via drilling, the RIT 10 is then picked up with cable means such as a standard wireline or slickline fishing assembly. The overshot used on the bottom of the fishing assembly and attached to the RIT upper fishing head 16 may also be configured with a shearable pin assembly to form a selectively shearable connection. The fishing string and RIT are then run into the hole via the slickline or wireline (not shown). The overshot 138 at the bottom end of the RIT 10 is then seated on the apparatus 140 and the cable means is used to shear the pin attaching the fishing string to the RIT leaving the RIT attached to the fishing head of the apparatus. Properly seated, the RIT source/sensor 141 will align axially with the sub slot(s) 38 due to the axial spacers 139 between the overshot 138 and RIT 10.

The cable means is then removed from the hole. The log is made as the BHA (and RIT/sub system) is tripped out of the hole. The same cable means and fishing assembly may also be used to retrieve the RIT 10 and apparatus 140 if the BHA becomes stuck in the hole. A steady pull instead of a shearing motion will typically remove the apparatus 140 from its landing shoe without shearing the shearable pin in the overshot connecting the two devices.

The previously described process for combining the RIT 10 with an MWD apparatus 140 is but one technique for implementing the invention. It will be appreciated by those skilled in the art that other overshot configurations/assemblies may be implemented with the invention depending on the conditions and requirements of the operation. Since the tool string, including the RIT, being run in the hole has at least two overshots 138 and both have multiple configurations, the possibilities are endless. For example, another process of the invention entails stopping the drilling operation to drop in the RIT on top of the MWD apparatus, logging the zone of interest, retrieving the RIT and continuing to drill with the apparatus 140 still in the hole.

Another embodiment of the invention combines the RIT 10 and slotted subs 30 for implementation with downhole apparatus equipped with nuclear or radiation-emitting sources, which require special handling and entail strict environmental considerations. One such apparatus is described in U.S. Pat. No. 4,879,463. The '463 patent describes an MWD apparatus disposed in a drill collar forming part of a drill string and housing a gamma ray source. The source is disposed within the collar on a retrievable carrier so that if the BHA becomes stuck or some other failure occurs, the gamma ray source can be fished out and retrieved from the well. FIG. 31 shows another embodiment of the invention including such a gamma ray source 146 disposed within the drill string 136.

The RIT 10 is equipped with a fishing head 16 at the upper end and includes an oversized diameter segment 148 in comparison to the rest of the RIT body. The oversized segment 148 can be formed on the RIT during manufacture, or a barrel can be mounted on the RIT using fasteners or any suitable means as known in the art. A "hanger sub" 150 is connected into the drill string. The sub 150 consists of a standard section of drill collar except that it includes a catch and hold centralizer 152 mounted within its inner bore. The centralizer 152 is similar to conventional centralizers and is large enough to allow an overshot tool 138 to pass through unobstructed while restricting passage of the oversized segment 148 on the RIT.

Thus the oversized segment 148 on the RIT provides a "hanging lip" that engages with the centralizer 152 to prevent the RIT from traveling deeper into the drill string. FIG. 32 shows a cross section of the centralizer 152. When the RIT is engaged within the hanger sub 150, the oversized segment 148 sits on the centralizer and channels 154 in the centralizer still allow for mudflow within the drill string 136.

With this embodiment, the RIT 10 can be landed in a sub above the nuclear or radiation emitting source 146 and still provide for retrievability of the source 146. If retrieval of the source 146 becomes necessary, the RIT is extracted by its fishing head 16 and then the fishing string is disposed through the centralizer 152 to retrieve the source from the source carrier 156. The embodiment of FIG. 31 shows the RIT 10 extending into a slotted sub 30 of the invention such that the sources/sensors 141 are aligned with the sub slots 38 when the oversized segment 148 is engaged with the centralizer 152. In this embodiment, an intermediate sub 158 is positioned between the hanger sub 152 and the slotted sub 30 in the drill string. A simple calculation is done to determine the appropriate sub 158 needed to ensure proper alignment of the source/sensor with the slots. In some embodiments the slotted sub 30 also incorporates the centralizer 152 (not shown). Other embodiments combine the centralizer 152 and the source carrier 156 in one slotted sub 30 so that only one additional sub is connected into the drill string to implement the invention (not shown).

For the purposes of this specification it will be clearly understood that the word "comprising" means "including but not limited to", and that the word "comprises" has a corresponding meaning.

While the methods and apparatus of this invention have been described as specific embodiments, it will be apparent to those skilled in the art that variations may be applied to the structures and in the steps or in the sequence of steps of the methods described herein without departing from the scope of the invention. For example, the invention may be implemented in a configuration wherein one RIT/sub unit is equipped to measure a combination of formation characteristics (e.g., resistivity, porosity and density).

What is claimed is:

1. A system for receiving a run-in tool, comprising:
   a sub having an elongated body with tubular walls and an inner bore, the sub adapted to form a portion of a length of drill string;
   the sub including at least one slot formed therein such that the slot fully penetrates the tubular wall to provide a channel for the passage of a signal;
   the sub including means to provide a pressure barrier between the interior and exterior of the tubular wall at the at least one slot, said barrier means located within the sub bore;
   a run-in tool having upper and lower ends and adapted for transit through the drill string and into the sub bore; and
   the run-in tool having means to engage with other apparatus at said upper and lower ends; wherein
   said upper and lower engagement means on said run-in tool are adapted for selective release from said other apparatus.

2. The system of claim 1, wherein the run-in tool is adapted to be pumped through the drill string or disposed on cable means within the drill string.

3. The system of claim 1, wherein the run-in tool includes a signal or energy source disposed thereon.

4. The system of claim 1, wherein the run-in tool includes a signal or energy sensor disposed thereon.

5. The system of claim 1, wherein the sub and run-in tool each include inductive coupling means disposed thereon.

6. The system of claim 1, the run-in tool further comprising at least one centralizer disposed thereon to position said tool within the sub.

7. The system of claim 1, further comprising at least one spacer adapted for connection at the lower end of the run-in tool to alter the length of said tool.

8. The system of claim 1, wherein said upper engagement means consists of a fishing head and said lower engagement means is adapted to receive a fishing head.

9. The system of claim 8, wherein said upper and lower engagement means are adapted to form a shearable connection.

10. A method for disposing a run-in tool within a sub in a length of drill string, comprising:
    (a) adapting a run-in tool having upper and lower ends for transit through the drill string and into a sub having an elongated body with tubular walls and an inner bore forming a part of said drill string, the sub including at least one slot fully penetrating its wall to provide a channel for the passage of a signal and barrier means within its bore to provide a pressure barrier between the interior and exterior of the wall at the at least one slot, said run-in tool adapted with selectively releasable means to engage with other apparatus at said upper and lower ends;
    (b) disposing the drill string with the sub within a subsurface formation, said drill string having an apparatus disposed within its inner bore and positioned near said sub; and (c) disposing the run-in tool within the drill string for engagement with said apparatus disposed within the inner bore of said drill string.

11. The method of claim 10, wherein step (a) includes determining the distance between at least one slot on said sub and a measurement point on said apparatus disposed within the bore of said drill string.

12. The method of claim 11, step (a) further including altering the length of the run-in tool, prior to disposal of said tool within the drill string, based on said determined distance.

13. The method of claim 11, wherein step (b) includes altering the length or position of said apparatus disposed within the bore of the drill string, prior to disposal of said drill string within said formation, based on said determined distance.

14. The method of claim 10, wherein step (a) includes mounting at least one centralizer to the exterior of said run-in tool.

15. The method of claim 10, wherein step (c) includes pumping said run-in tool through said drill string.

16. The method of claim 10, wherein step (c) includes disposing the run-in tool through said drill string on cable means connected to said upper engagement means of said tool.

17. The method of claim 16, step (c) further including releasing said cable means from said upper engagement means upon engagement of said tool with said apparatus disposed within said drill string.

18. The method of claim 17, wherein said run-in tool includes a signal source or sensor disposed thereon.

19. A method for disposing a run-in tool within a sub in a length of drill string, comprising:
 (a) adapting a run-in tool having upper and lower ends for transit through the drill string and into a sub having an elongated body with tubular walls and an inner bore forming a part of said drill string, the sub including at least one slot fully penetrating its wall to provide a channel for the passage of a signal and barrier means within its bore to provide a pressure barrier between the interior and exterior of the wall at the at least one slot, said run-in tool having a signal source or sensor disposed thereon and adapted with selectively releasable means to engage with other apparatus at said upper and lower ends;
 (b) adapting the run-in tool or an apparatus disposed within the bore of said drill string such that the signal source or sensor on said run-in tool is positioned near the at least one slot when said tool is disposed within said sub and engaged with said apparatus;
 (c) disposing the drill string, along with said sub and said apparatus disposed within its inner bore, within a subsurface formation; and
 (d) disposing the run-in tool within the drill string for engagement with said apparatus.

20. The method of claim 19, wherein step (d) includes pumping said run-in tool through said drill string.

21. The method of claim 19, wherein step (d) includes disposing the run-in tool through said drill string on cable means connected to said upper engagement means of said tool.

22. The method of claim 21, step (d) further including releasing said cable means from said upper engagement means upon engagement of said tool with said apparatus disposed within said drill string.

23. The method of claim 19, further comprising (e) retrieving the run-in tool from the sub at a determined time while maintaining the drill string within the formation.

24. A system for receiving a run-in tool, comprising:
 a first sub having an elongated body with tubular walls and a central bore, the sub being adapted to form a portion of a length of drill string;
 an elongated run-in tool having upper and lower ends and adapted for transit through the drill string and into the first sub bore;
 the run-in tool adapted with connecting means at the upper end to connect with other apparatus for removal of said tool from the first sub bore;
 a segment of the run-in tool having an oversized diameter compared to other segments of said tool;
 the first sub adapted with means to catch and hold the run-in tool by said oversized segment such that a predetermined length of said run-in tool extends into the sub bore and the run-in tool is restricted from further axial displacement into the bore; and
 the catch and hold means adapted to permit the passage of fluid through said bore while holding said run-in tool by said oversized segment.

25. The system of claim 24, wherein said run-in tool comprises a source or sensor disposed thereon.

26. The system of claim 25, wherein the walls of said first sub are fully metallic.

27. The system of claim 26, wherein the run-in tool is adapted to be pumped through the drill string or suspended on a cable within the drill string.

28. The system of claim 27, wherein the source or sensor is respectively adapted to transmit or receive electromagnetic energy.

29. The system of claim 27, wherein said first sub is connected into a drill string, said drill string including a second sub having tubular walls and a central bore with at least one slot formed therein such that the slot fully penetrates the tubular wall and means to provide a pressure barrier between the interior and exterior of the tubular wall at the at least one slot.

30. The system of claim 29, wherein the oversized diameter segment on the run-in tool is located on the tool such that the source or sensor on the run-in tool is positioned near the slot in the second sub when the run-in tool is engaged within the catch and hold means on the first sub.

31. The system of claim 27, wherein the sub includes at least one slot formed therein such that the slot fully penetrates the tubular wall and means to provide a pressure barrier between the interior and exterior of the tubular wall at the at least one slot.

32. The system of claim 31, wherein the oversized diameter segment on the run-in tool is located on the tool such that the source or sensor on the run-in tool is positioned near the slot in the sub when the run-in tool is engaged within the catch and hold means on the sub.

33. A method for disposing a run-in tool within a sub in a length of drill string, comprising:
 (a) adapting an elongated run-in tool such that a segment of the tool includes an oversized diameter compared to other segments of said tool, the tool having upper and lower ends and adapted for transit through the drill string;
 (b) disposing the run-in tool through the drill string for engagement in the bore of a first sub forming part of said drill string;

(c) catching the run-in tool by the oversized segment with catch and hold means disposed in the first sub, said means permitting a predetermined length of said tool to extend into the sub bore; and (d) with the catch and hold means, restricting the run-in tool from further axial displacement into said bore such that a source or sensor on the tool is positioned near a slot in the wall of said drill string when the tool is engaged within the catch and hold means on the first sub.

34. The method of claim 33, wherein the slot in the drill string wall is a fully penetrating slot formed in a second sub forming part of said drill string and said second sub includes means to provide a pressure barrier between the interior and exterior of said wall at the slot.

35. The method of claim 34, wherein step (b) comprises pumping the run-in tool through the drill string or suspending said tool on a cable within the drill string.

36. The method of claim 35, wherein the source or sensor is respectively adapted to transmit or receive electromagnetic energy.

* * * * *